(12) United States Patent
Douglas

(10) Patent No.: US 6,178,431 B1
(45) Date of Patent: Jan. 23, 2001

(54) METHOD AND SYSTEM FOR PROVIDING SIDE NOTES IN WORD PROCESSING

(75) Inventor: Gavin L. Douglas, Roanoke, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 08/321,058

(22) Filed: Oct. 5, 1994

(51) Int. Cl.$^7$ .................................................. G06F 17/21
(52) U.S. Cl. .......................................................... 707/512
(58) Field of Search .................. 395/145–6; 364/419.14, 364/419.15, 419.17, 419.18, 419.19; 382/13, 10, 11, 15

(56) References Cited

U.S. PATENT DOCUMENTS

| | | | |
|---|---|---|---|
| 4,645,238 | | 2/1987 | Vincent et al. ......................... 283/67 |
| 4,974,194 | * | 11/1990 | Barker et al. ......................... 707/540 |
| 4,984,162 | * | 1/1991 | Torii et al. ........................... 707/530 |
| 5,063,600 | * | 11/1991 | Norwood ............................. 382/186 |
| 5,146,552 | * | 9/1992 | Cassorla et al. ...................... 707/512 |
| 5,181,255 | * | 1/1993 | Bloomberg ........................... 382/176 |
| 5,297,216 | * | 3/1994 | Sklarew .............................. 382/189 |
| 5,309,359 | * | 5/1994 | Katz et al. ........................... 707/102 |

FOREIGN PATENT DOCUMENTS

| | | |
|---|---|---|
| 0250176 | 12/1987 | (EP) . |
| 2297156 | 12/1990 | (JP) . |

OTHER PUBLICATIONS

English abstract of Japanese translation #2–297156.
Barker et al., Method for Creating Annotation Data, vol. 28, No. 4 Sep. 1985.
Barker et al., Footnoting in a Text Editor, vol. 27, No. 10B, Mar. 1985.
M.E. Payne et al., Naming an Excess Scheme for Annotation Text Segments, vol. 28, No.5, Oct. 1985.
E.R. Beck, Multiple Annotation Classes, vol. 28, No. 5, Oct. 1985.

* cited by examiner

Primary Examiner—Stephen S. Hong
Assistant Examiner—Cesar B Paula
(74) Attorney, Agent, or Firm—Geoffrey A. Mantooth

(57) ABSTRACT

A word processing object on a data processing system has a body consisting of text (and perhaps graphics). The body has right and left side margins. A user can select a location in the body and provide an annotation in a side margin. The annotation is located adjacent to the selected body location. The annotation is associated with the selected body location so that subsequent editing or pagination of the body maintains the annotation adjacent to the selected body location. The annotation can contain text and graphics. The annotation can be edited. The annotation can be displayed and printed either by itself or in context with the body. The annotation can also be formatted to be displayed or printed in a form different from the body. The annotation can be made to appear in alternating side margins (for example, left margin, right margin, left margin, etc.) of successive pages of the body.

12 Claims, 29 Drawing Sheets

METHOD AND SYSTEM FOR PROVIDING SIDE NOTES IN WORD PROCESSING

TECHNICAL FIELD OF THE INVENTION

The present invention relates to data processing methods and systems in general and in particular to methods and systems for word processing.

BACKGROUND OF THE INVENTION

Word processing systems allow the creation of textual documents in an electronic medium. Words can be electronically added to, deleted from, or modified within a document. In addition, the format of a document, such as character type and size and line spacing, can be electronically changed. Graphics or pictures can also be incorporated into the body of text in the document.

It is frequently desirable to add reference information or comments to a document, regardless of whether the document is created by word processing or in some other manner. Reference information can be included by the author of a document. A common manner for an author's reference information to be included is by footnotes. Reference information can also be included by one or more readers. A reader of the document may wish to edit the document or else to add comments thereto, for either the author's or the reader's benefit.

With prior art word processing systems, reference information can be added by footnotes. Alternatively, prior art word processing systems allow reference information to be added to the body of text making up the document. The reference information can be visible within the body text, wherein the reference information is separated from the text in the body by delimiters. The reference information can also be normally hidden. Viewing the reference information causes the reference information to appear in the body text and to obscure underlying portions of the body text from a user's view.

SUMMARY OF THE INVENTION

An object of the present invention is to provide a method and apparatus for providing reference information along the sides of a document.

The present invention provides annotation of a word processing object on a data processing system. The word processing object has a body with at least one side margin. The present invention locates a marker at a selected location in the body. An annotation is associated with the marker. The word processing object is provided to an output means with the annotation being located in the side margin and adjacent to the marker.

With the present invention, an author or reader of a word processing object can provide annotations in the side margins of the body of the word processing object. The side annotations can be used to add comments, and even provide a running commentary of the word processing object. Because the annotations appear in the side margins, they do not interfere with reading the body, as do footnotes, nor do they interrupt the flow of reading the body, as do annotations located in the body itself. The annotations can be saved and made a permanent part of the word processing document.

Each annotation is associated with a specific location in the body. Thus, no matter how much the body is revised, the annotation will maintain its adjacent relationship to the specified body location.

In one aspect of the present invention, the annotation can contain text, non-text objects, or both. Non-text objects include graphic objects, image objects, audio objects and video objects.

In another aspect, the annotations can be displayed and printed either by themselves or in context with respect to the body. When the annotations are displayed by themselves, they are displayed by way of a window. The annotations can be printed by themselves. When the annotations are displayed or printed in context, they appear in the side margins of the body text, so that a user can see the location of the annotations relative to the body text.

Once an annotation has been added in a side margin, it can be edited by deleting or modifying it. The annotations can be deleted one at a time, or can all be deleted at once.

The annotations can be formatted independently of the body text of the word processing object. Thus, the typeface, typesize, typestyle, line density and line spacing can either be the same as or different from the formatting of the body text. In addition, the annotations in the side margins can have their own paragraph indenting and alignment, and widow/orphan control independently of the body.

The annotations can be made to appear in alternating margins. This allows the annotations to appear in the outermost margin of a page. For example, on a left hand page, the annotation would appear in the left side margin. On a right page, the annotation would appear in the right side margin.

BRIEF DESCRIPTION OF THE DRAWINGS

FIGS. 2a–12d are flow charts of the present invention, in accordance with a preferred embodiment.

FIGS. 2a–2d show the main flow chart, which branches off to the other flow charts.

FIG. 5 shows the flow chart for deleting a side note.

FIG. 8 shows the flow chart for displaying a side note in full screen.

FIG. 9 shows the flow chart for displaying a side note in context.

FIG. 10 shows the flow chart for selecting a side note format.

FIG. 11 shows the flow chart for setting a default side note format.

FIGS. 12a–12d show the flow chart for maintaining alignment of the side notes with the associated body text portions during revisions of the body text.

DESCRIPTION OF THE INVENTION

Figure 1:
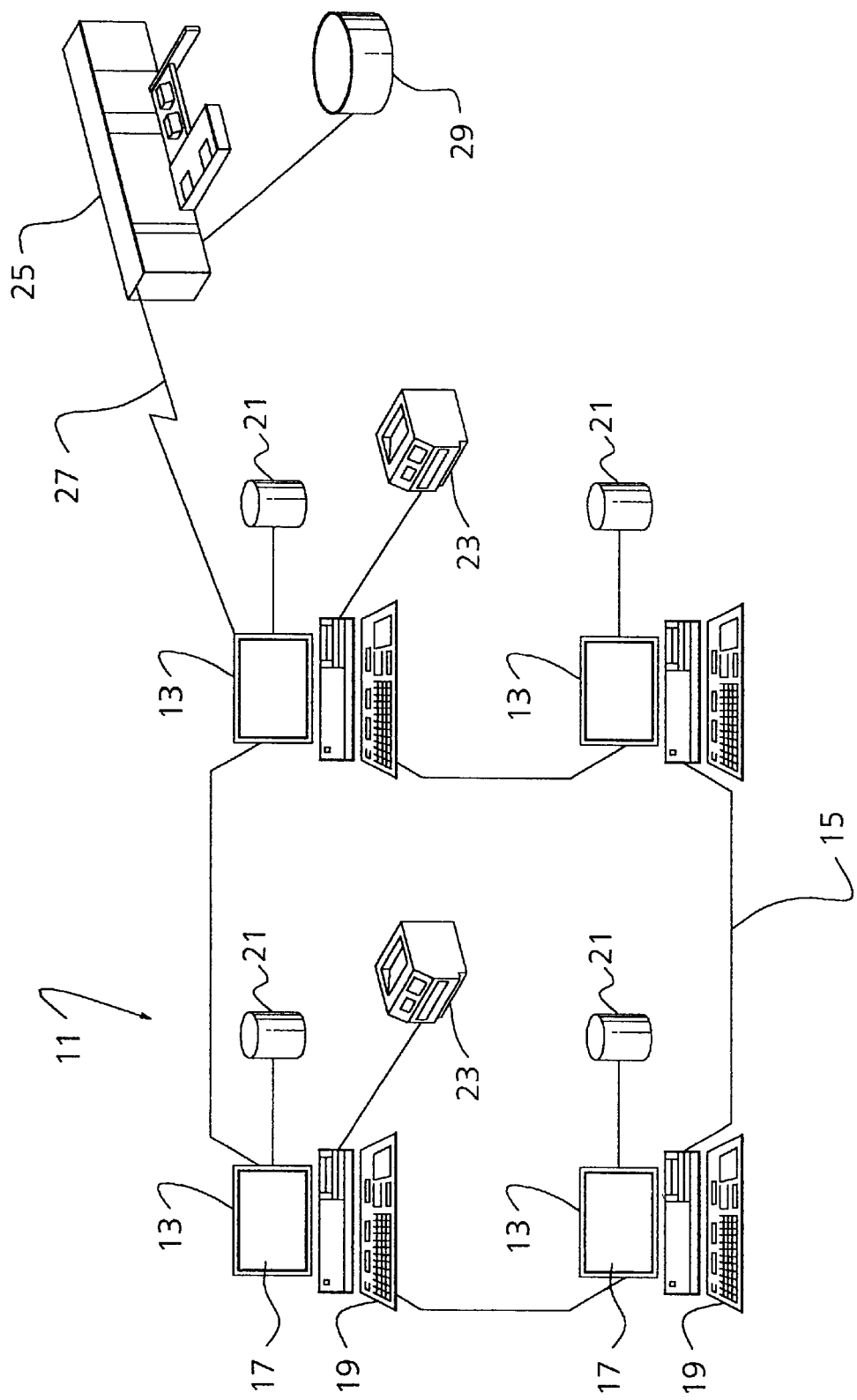
FIG. 1 is a schematic view of a data processing system on which the present invention can be practiced.
Figure 2A:
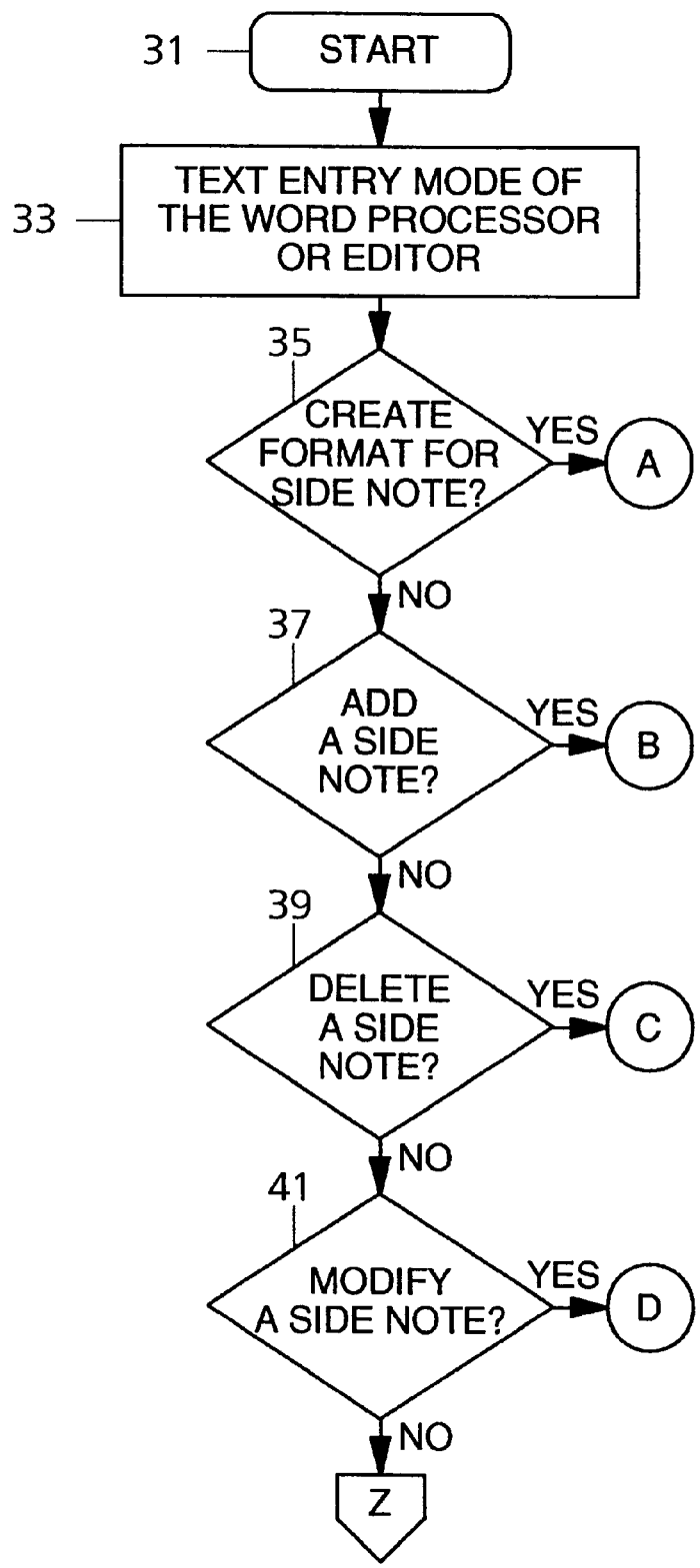
Figure 2B:
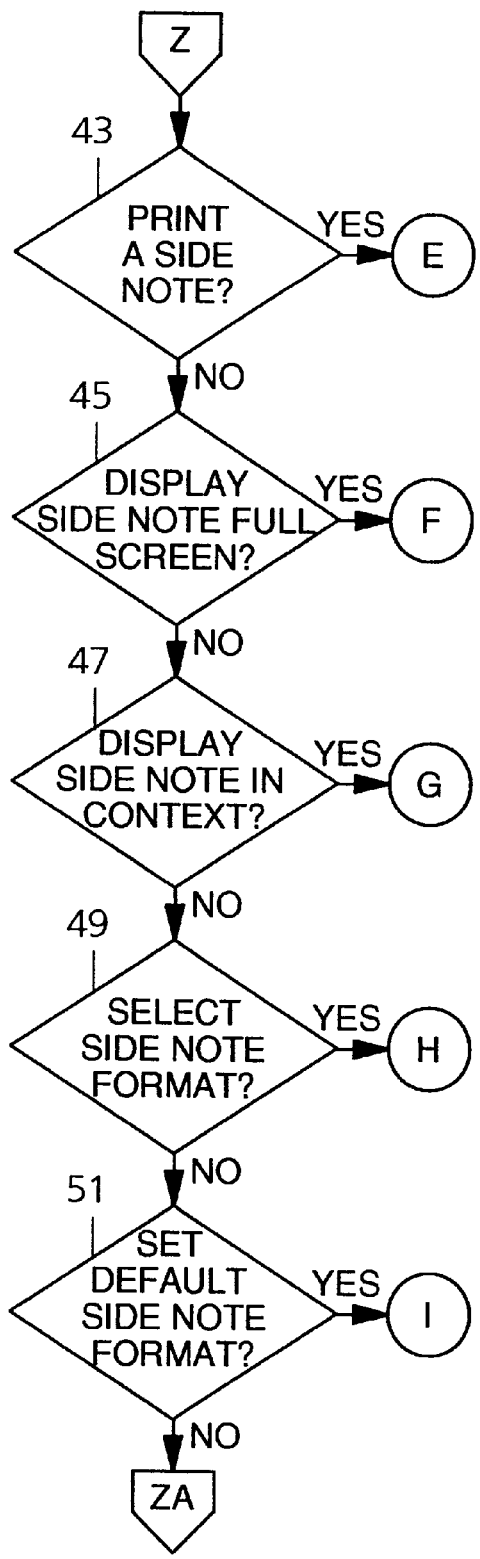
Figure 2C:
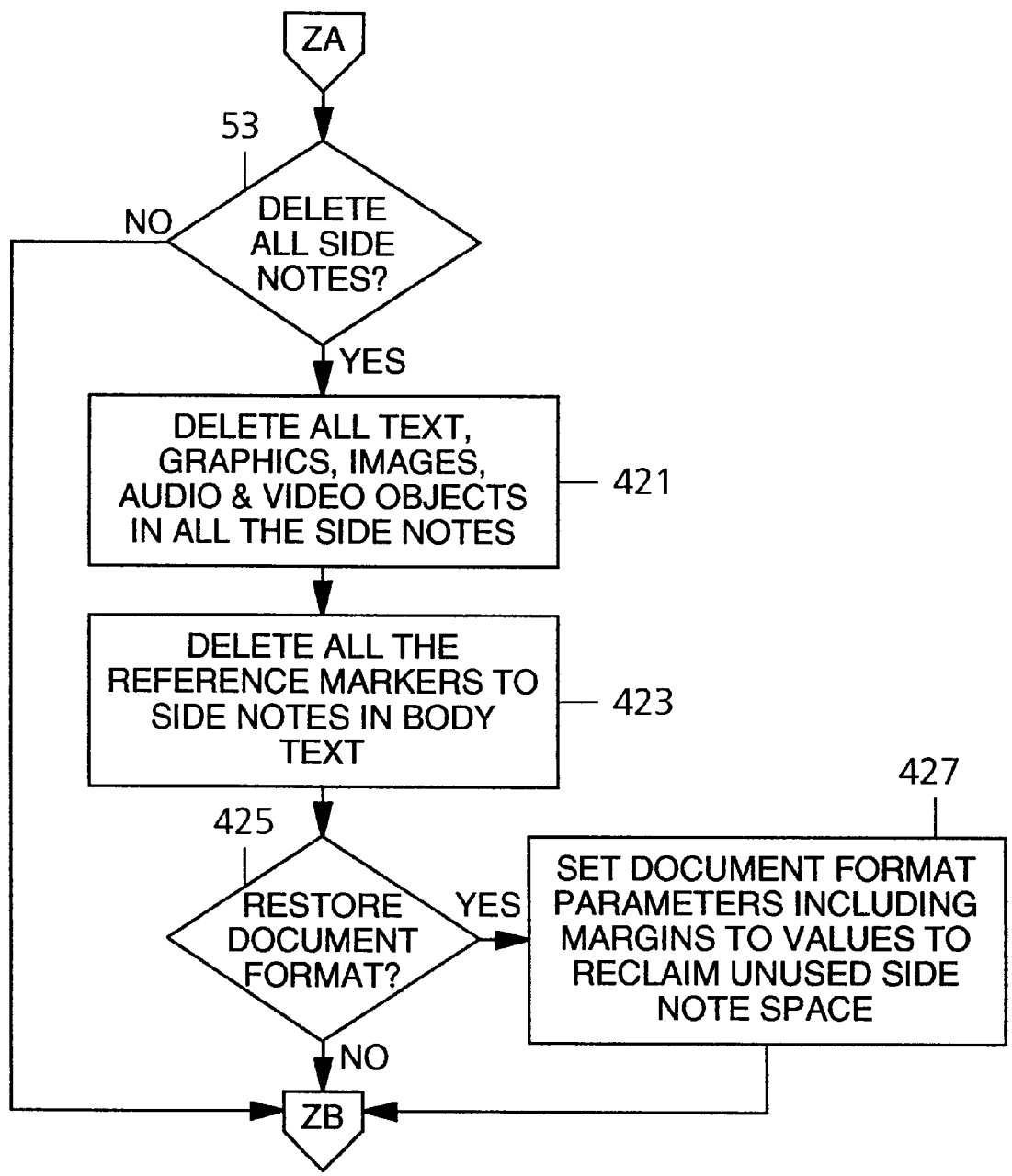
Figure 2D:
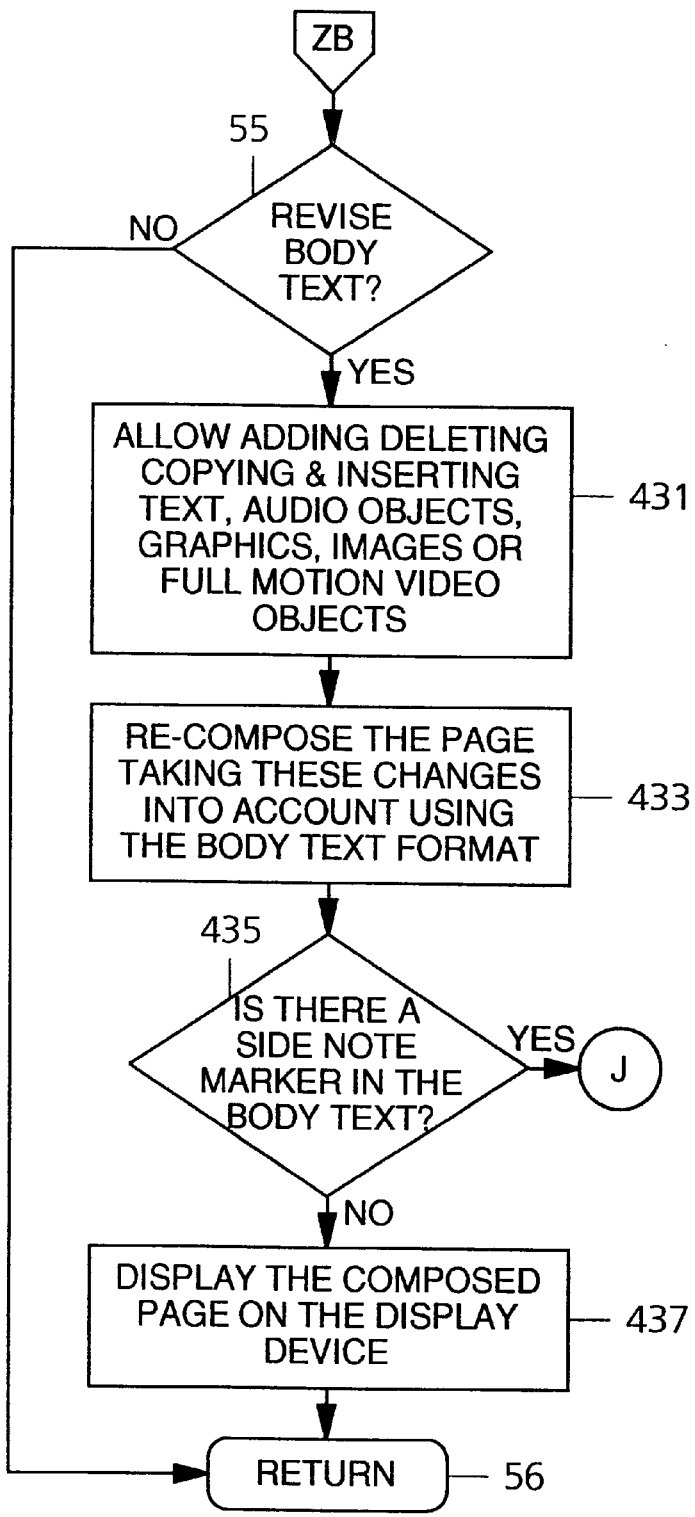

In FIG. 1, there is shown a schematic diagram of a data processing system 11, upon which the present invention can be practiced. The data processing system 11 includes plural individual computers or workstations 13 which are connected together in a local area network (LAN) 15. Each workstation 13 includes a user interface, which has a display screen 17 and a keyboard 19. Each workstation 13 may also be coupled to a storage device 21 and to a printer or output device 23. One or more of such storage devices 21 may be utilized, in accordance with the present invention, to store applications or resource objects which may be periodically accessed by any user within the data processing system 11. The present invention can be implemented on an individual computer 13.

The data processing system 11 may also include a mainframe or host computer 25 that is coupled to one of the workstations by a communication link 27. The host computer 25 may also be coupled to a storage device 29 which may serve as a remote storage for the computers.

One or more of the computers 13 allow a user to conduct word processing operations. For example, one such word processing program is the DisplayWrite program from IBM.

The present invention allows a user to create, edit, print and display side notes on a word processing document. An example of a multi-page document with the side notes of the present invention, in accordance with a preferred embodiment, is given:

---

Example:

1. INTRODUCTION

| We need a longer introduction to this document. | The SailBoat product is to serve as the Hex Editor for the X Display product. Display will run within OS/2. SailBoat provides editable interchange with members of the Hexel family via Hex Form Text Document Control Architecture (HFT DCA). SailBoat will also edit ASCII and FFT files. |
|---|---|
| I have a problem with this. | The basic SailBoat code is an adaptation of the Wind product X which in turn is an adaptation of the Hexel Companion product. The testing described in this document will be based on test cases from the Wind functional test library, modified where necessary for new SailBoat function operating in the OS/2 environment. |
| This does not make sense. | A general description of the structure, responsibilities and definitions of X product test and testing terms is contained in the Display Comprehensive Test Plan (CTP). |

A. PRODUCT OBJECTIVES

The Hex Editor product objectives are as follows:
 Port Wind base code to be run within OS/2 as part of the Display product.

| | I want Charlie to have this responsibility. |
|---|---|
| Exploit the capabilities of OS/2. | |

Enhance the Wind base code with 2 new functions;
  1 Get/Put ASCII and RFT
  2 Improved DBCS tolerance
 These above 2 items are contingent upon development resources being provided by Display development.

B. TEST PURPOSE AND SCOPE

| This test plan defines the software Component Testing (CT) process and the strategy for functionally verifying the SailBoat Hex Editor. Component test will be coordinated by John Booth 100S Editor Products Test, in our lab facilities. | We have no strategy for testing. |
|---|---|

C. ASSUMPTIONS

| | The SailBoat Component testing described in this plan makes the following assumptions: |
|---|---|
| Are these all the assumptions? | Hex Editor will be a modification of the basic Wind Hex Editor Code. |
| | No specific SailBoat performance test will be run. |
| | No specific hardware or configuration testing is implied. |
| | No specific SailBoat usability tests will be run. |
| | No specific SailBoat printer tests will be run. |
| | Regression to performed at the Display level. |
| | No SailBoat System Test will be performed. |
| | All testing will be run on the US English version. |
| | All PTRs should be resolved prior to Component Test exit. |

D. TEST PLAN OBJECTIVES

The objective of this Test Plan is to describe the procedures, methods, schedules, dependencies and assumptions of functionally testing all components of the SailBoat Hex Editor.

(End of Example)

---

The document of the example has body text, located on pages 1–3. The body text describes a fictional proposal for a computer program product. The body text contains the following headings: "1. INTRODUCTION", "A. PRODUCT OBJECTIVES", "B. TEST PURPOSE AND SCOPE", "C. ASSUMPTIONS", and "D. TEST PLAN OBJECTIVES", along with the text following each heading.

The body text has right and left side margins. Side notes are located within one of these side margins of each page. The side notes provide comments or reference information to a reader. In the example, the side notes were provided by a reader of the proposal and the function to add comments to the body text. Each side note is associated with a specific paragraph in the body text. For example, on the first page, the first side note, "We need a longer introduction to this document.", is associated with the first paragraph of the body text.

In the example given, the body text is characterized as being continuous and broken only by the headings. The side note commentary, being located off to the side, does not interfere with the continuity of the body text. Yet, the side notes are located adjacent to the relevant portions of body text, so as to be easily accessible to the eye of a reader.

The side notes can appear in either the right or left margins. In the example, the side notes are alternating, so that on the first and third pages, which are left hand pages, the side notes appear in the left, or outermost, margin. On the second page, which is a right hand page, the side notes appear in the right margin. For example, the side note "I want Charlie to have this responsibility." appears in the right side margin.

The side notes contain text. However, the side notes can also contain pictures or images as well.

The document and its side notes are created on a computer 13 using a word processing system that is modified to provide side note capability. The author can create the document and then transfer it, either over the LAN or by floppy disk, to another user. The other user can electronically add the side notes in the margins of the document.

Referring now to FIGS. 2a–12d, the methods for creating, editing, viewing and printing side notes will now be described. In the flow charts, the following graphical conventions are observed: a rectangle for either a process, function or screen display, a diamond for a decision about a user input or data, and a circle or a pentagon for an off page connector. These conventions are well understood by programmers skilled in the art of user interfaces and the flow charts are sufficient to enable a programmer skilled in the art to write code in any suitable computer programming language, such as BASIC, PASCAL or C for a computer such as the IBM Personal System/2 (PS/2) family of computers which supports these languages.

The side note method of the present invention is used in conjunction with a conventional word processing program and may in fact be added as a retrofit into an existing word processing program.

FIGS. 2a–2d show the main flow chart. The method of FIGS. 2a–2d is invoked by a user of a computer 13. This invocation could occur, for example, by the user selecting a menu choice for implementing the side note method. The menu choice is displayed on the screen 17.

When the main method begins, step 31, the method enters, step 33, the text entry mode of the word processing or editor program that is associated with the side note method of the present invention. In steps 35–53, the method determines the type of operation that the user wishes to perform. This is determined from the specific input provided by the user. In step 35, the method determines if the user wishes to create a format for a side note. If the result of step 35 is YES, then the main method proceeds to the format method of FIGS. 3a–3h. The method of FIGS. 3a–3h allows a user to create a format for the side notes. Thus, the side notes can be displayed and printed in a format that is independent of the format of the body text. The format of the side notes can be determined by controlling the typeface, size and style of the characters, the line density and spacing, type of paragraph indents and alignments, tabs, margins of the side note area, borders for the side note area, whether the side notes are subject to widow/orphan control and whether the side notes appear in alternating side margins (that is left side margin on left pages, right side margin on right pages). If the result of step 35 is NO, then the main method proceeds to step 37 of FIG. 2a.

In step 37, the main method determines if the user wishes to add a side note. If the result of step 37 is YES, then the main method proceeds to the add method of FIGS. 4a and 4b. If the result of step 37 is NO, then the main method proceeds to step 39.

In step 39, the main method determines if the user wishes to delete a side note. If the result of step 39 is YES, then the main method proceeds to the delete method of FIG. 5. If the result of step 39 is NO, then the main method proceeds to step 41.

In step 41, the main method determines if the user wishes to modify a side note. If the result of step 41 is YES, then the main method proceeds to the modify method of FIGS. 6a–6c. If the result of step 41 is NO, then the main method proceeds to step 43, in FIG. 2b.

In step 43, the main method determines if the user wishes to print a side note. If the result of step 43 is YES, then the main method proceeds to the print method of FIGS. 7a and 7b. If the result of step 43 is NO, then the main method proceeds to step 45.

In step 45, the main method determines if the user wishes to display the side note in full screen. If the result of step 45 is YES, then the main method proceeds to the display method of FIG. 8. If the result of step 45 is NO, then the main method proceeds to step 47.

In step 47, the main method determines if the user wishes to display the side note in context with the body text. If the result of step 47 is YES, then the main method proceeds to the display method of FIG. 9. If the result of step 47 is NO, then the main method proceeds to step 49.

In step 49, the main method determines if the user wishes to select a side note format. If the result of step 49 is YES, then the main method proceeds to the selecting method of FIG. 10. If the result of step 49 is NO, then the main method proceeds to step 51.

In step 51, the main method determines if the user wishes to set a default side note format. If the result of step 51 is YES, then the main method proceeds to the setting method of FIG. 11. If the result of step 51 is NO, then the main method proceeds to step 53 in FIG. 2c.

In step 53, the main method determines if the user wishes to delete all of the side notes in the document. If the result of step 53 is YES, then the method proceeds to step 421 to restore the body text format and delete all side notes. If the result of step 53 is NO, then the main method proceeds to step 55 in FIG. 2d.

In step 55, the main method determines if the user wishes to revise the body text. If the result of step 55 is YES, then the main method proceeds to step 431 to allow revision of the body text, while maintaining the side notes adjacent to the respective associated body text portions. If the result of step 55 is NO, then the main method returns, step 56.

The main method of FIGS. 2a–2d need not be implemented sequentially as shown. Instead, the various options can be presented to the user as a menu that appears in a side note editor window which is displayed upon the invocation of the side note method by the user.

Figure 3A:
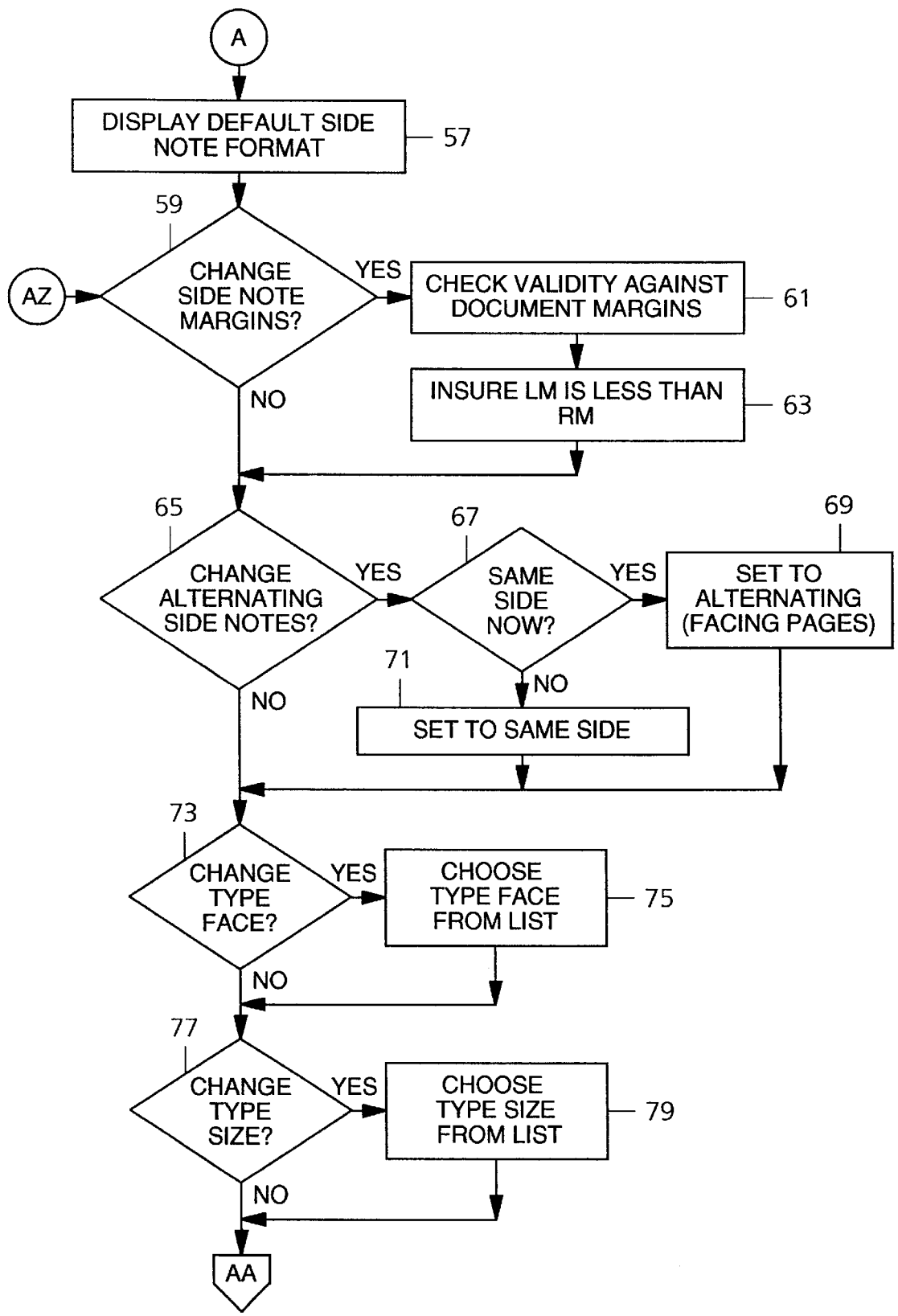
FIGS. 3a–3h show the flow chart for creating a side note format.

Referring now to FIGS. 3a–3h, the method of creating a side note format will be described. Referring first to FIG. 3a, the default side note format is displayed, step 57. (The default side note format is selected with the setting method of FIG. 11.) A side note is displayed either in a window by itself or in context with the body text. The manner of display is selected by the user in steps 45 and 47 of FIG. 2b.

In step 59 of FIG. 3a, the method determines if the user wishes to change the margins of the side note. If the result to step 59 is YES, then the validity of the user provided side note margin is checked against the margins of the document containing the body text, step 61. Also, in step 63, the left margin is checked to determine that it is less than the right margin. The method proceeds to step 65 after step 63 or else if the result of step 59 is NO.

In step 65, the method determines if the user wishes to change alternating side notes. The option of alternating side notes allows side notes to appear in alternating margins on facing pages. As shown in the example described above, alternating side notes allows the side notes on the first and third pages of the example to be located in the left hand margin, while the side notes on the second page are located in the right margin. This allows the side notes to be in the outermost margins, regardless of what page they appear on. If the result of step 65 is YES, then the method proceeds to step 67 to determine if the side notes are currently all on the same side of the body text. If the result of step 67 is YES, then the method proceeds to step 69 to set the side notes to alternating on facing pages. If the result of step 67 is NO, then the method proceeds to step 71 to set the side notes to appear on the same side. The method then proceeds to step 73 after either step 69, step 71, or if the result of step 65 is No.

In step 73, the method determines if the user wishes to change the typeface of selected characters. Examples of typefaces included Courier and Roman. If the result of step 73 is YES, then in step 75, the method allows the user to choose a typeface from a list that is displayed on the screen 17. This list may be obtained from the word processor. After step 75, or if the result of step 73 is NO, the method proceeds to step 77. In step 77, the method determines if the user wishes to change type size. One way to express type size is in points, which express the height of a character. If the result of step 77 is YES, then the method proceeds to step 79 to allow the user to choose a type size from a list that is provided on the screen 17. After step 79, or if the result of step 77 is NO, then the method proceeds to step 81 in FIG. 3b.

Figure 3B:
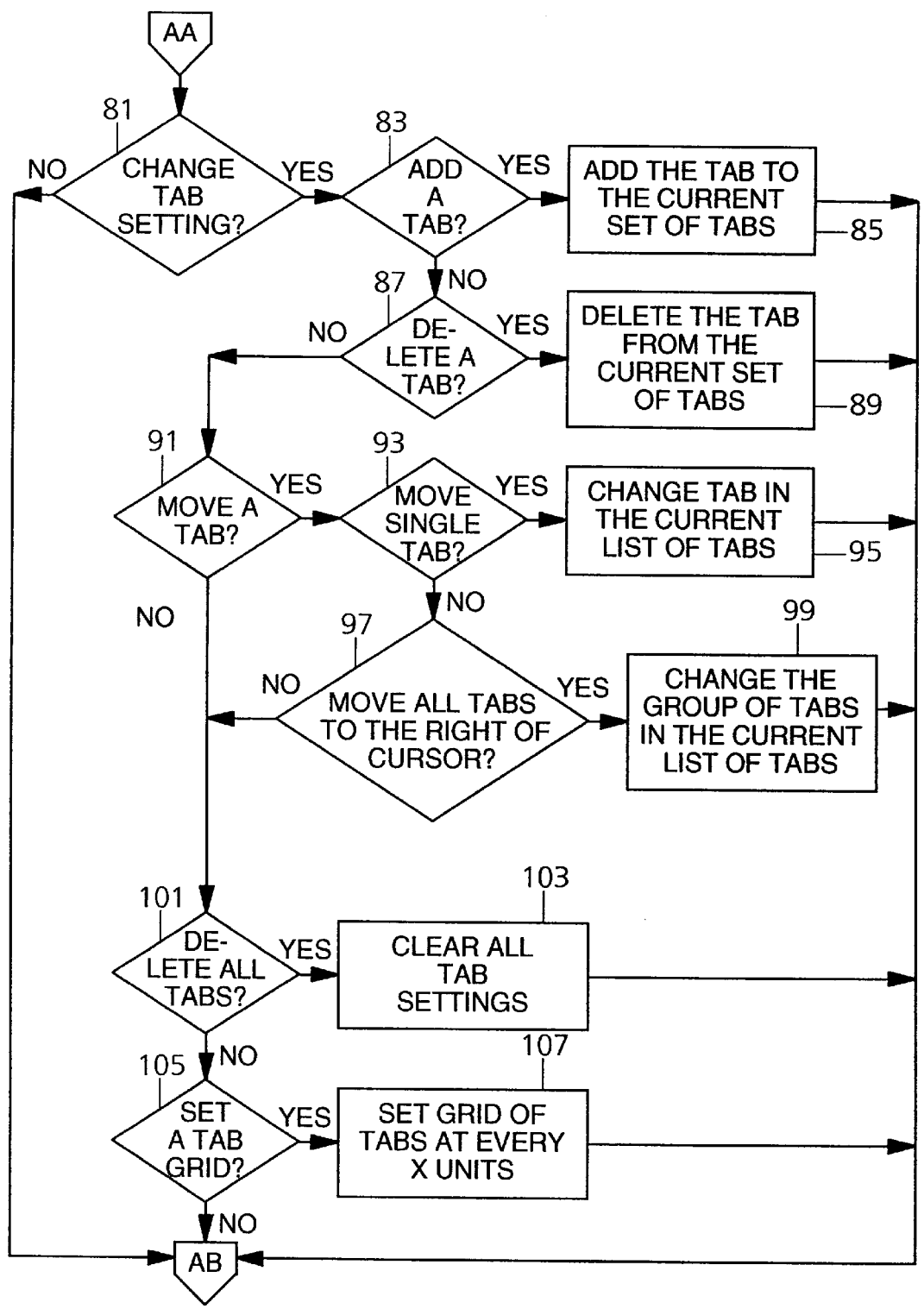

Referring to FIG. 3b, in step 81, the method determines if the user wishes to change tab settings in the side note area. Tabbing in the side note area is referenced to the left hand margin of the side note area. The left margin of the side note could be the same as the right margin of the body text if the side note was located in right margin of the body text. Alternatively, the left margin of the body text could be the right margin of the side note, if the side note was located in the left margin of the body text. It is a preferred that a gutter of empty space occur between the side notes and the body text, in order to prevent the side note characters from contacting or being too close to the body text characters.

If the result of step 81 is YES, then the method proceeds to step 83 to determine if the user wishes to add a tab. If the result of step 83 is YES, then in step 85 the method adds the tab to the current set of tabs. The current set of tabs contain the default tabs for the side note area. After step 85, the method proceeds to step 109 in FIG. 3c. If the result of step 83 is NO, then the method proceeds to step 87 to determine if the user wishes to delete a tab. If the result of step 87 is YES, then, in step 89, the method deletes the tab from the current set of tabs and then proceeds to step 109. If the result of step 87 is NO, then the method determines if the user wishes to move a tab, step 91. If the result of step 91 is YES, then the method determines if the user wishes to move a single tab, step 93. If the result of step 93 is YES, then in step 95, the method changes the tab in the current list of tabs and proceeds to step 109. If the result of step 93 is NO, then the method proceeds to step 97 to determine if the user wishes to move all tabs to the right of the cursor. This allows the user to provide that tabs to the left of the cursor will not move. If the result of step 97 is YES, then the method proceeds to step 99 to change the group of tabs in the current list of tabs and then proceeds on to step 109. If the result of either step 91 or step 97 is NO, then the method proceeds to step 101 to determine if the user wishes to delete all tabs. If the result of step 101 is YES, then in step 103, the method clears all tab settings, and proceeds to step 109. If the result of step 101 is NO, then the method proceeds to step 105 to determine if the user wishes to set a tab grid. A tab grid allows a user to tab in fixed increments. For example, a user could put a tab stop every five characters or every one inch. If the result of step 105 is YES, then in step 107, a grid of tabs is set at every X number of units (which is user specified), and the method proceeds to step 109. If the result of either step 81 or step 105 is NO, then the method proceeds to step 109.

Figure 3C:
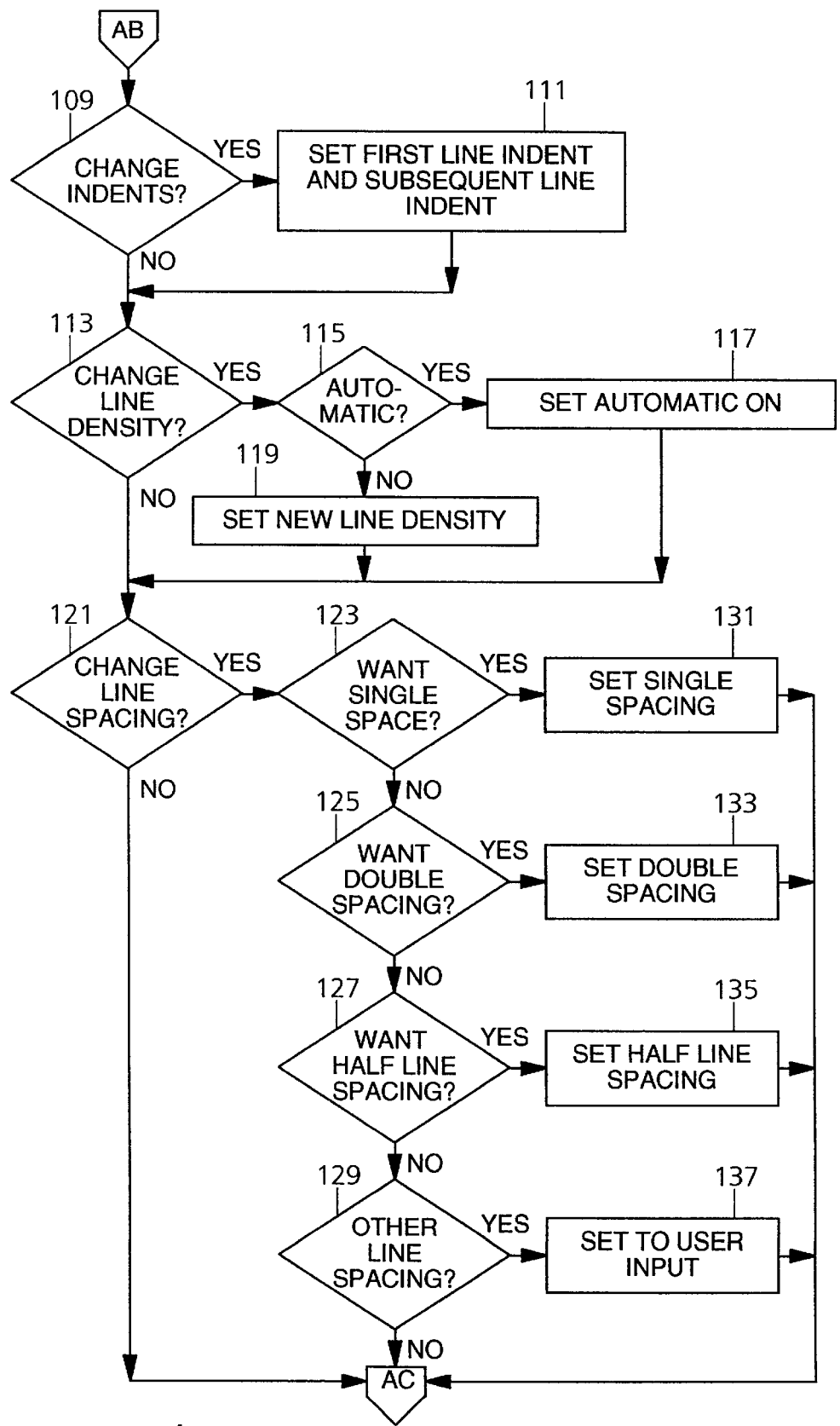

Referring to FIG. 3c, in step 109, the method determines if the user wishes to change the paragraph indents of the side notes. If the result of step 109 is YES, then in step 111, the method sets the first line indent and subsequent line indents for all paragraphs. For example, a side note can be indented as a normal paragraph, wherein the first line is indented. This patent specification uses normal paragraphs. Alternatively, a paragraph can be in a block form, where the first and subsequent lines are indented the same amount like the example given above. Further still, a paragraph could be formatted in a hanging indent manner where the first line is not indented, but subsequent lines are indented. After step 111, or if the result of step 109 is NO, the method proceeds to step 113.

In step 113, the method determines if the user wishes to change line density. Line density is a measure between the base of lines of text and may be expressed in lines per inch. For example, for typewriters it is standard to have six lines per inch. Another way of expressing line density is in terms of points of leading. If the result of step 113 is YES, then the method proceeds to step 115 to determine if the line density is to be automatic. If the result of step 115 is YES, then the automatic line density is set to on, step 117. This gives the best general appearance from a typesetter's point of view for the side notes. If the result of step 115 is NO, then in step 119, the new line density is set. The new line density is user provided. After step 117, step 119, or if the result of step 113 is NO, the method proceeds to step 121.

In step 121, the method determines if the user wishes to change line spacing. Line spacing is typically expressed as given a certain line density, then a certain number of lines should be skipped. For example, this patent specification is typed with one and a half line spacing. If the result of step 121 is YES, then the method proceeds to step 123. Steps 123–129 determine if the user wants single spacing, step 123, double spacing, step 125, half-line spacing, step 127, or other line spacing, step 129. In step 131, single line spacing is set, in step 133, double spacing is set, in step 135, half-line spacing is set, and in step 137, the line spacing is set to the user input. After setting the appropriate line spacing, or else if the result of step 121 is NO, then the method proceeds to step 139 in FIG. 3d.

Figure 3D:
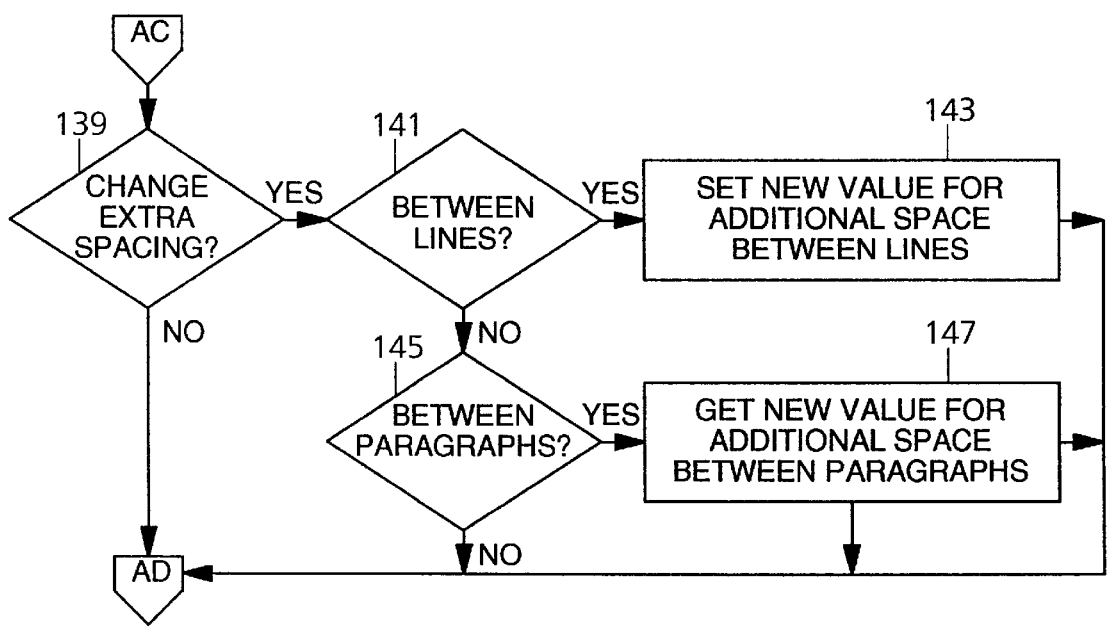

Referring to FIG. 3d, in step 139, the method determines if the user wishes to change extra spacing. This allows a user to provide additional spacing between lines and paragraphs. If the result of step 139 is YES, then the user is allowed to put extra leading between lines and paragraphs in addition to the line density provided above. In step 141, the method determines if the extra spacing is to be between lines. If YES, then in step 143, a new user-provided value for additional space between the lines is set. If the result of step 141 is NO, then in step 145, the method determines if the extra spacing is to be between paragraphs. If the result of step 145 is YES, then in step 147, the method sets the new user-provided value for additional space between paragraphs. After the steps of 143, 147, or if the result of steps 139 or 145 is NO, then the method proceeds to step 149 in FIG. 3e.

Figure 3E:
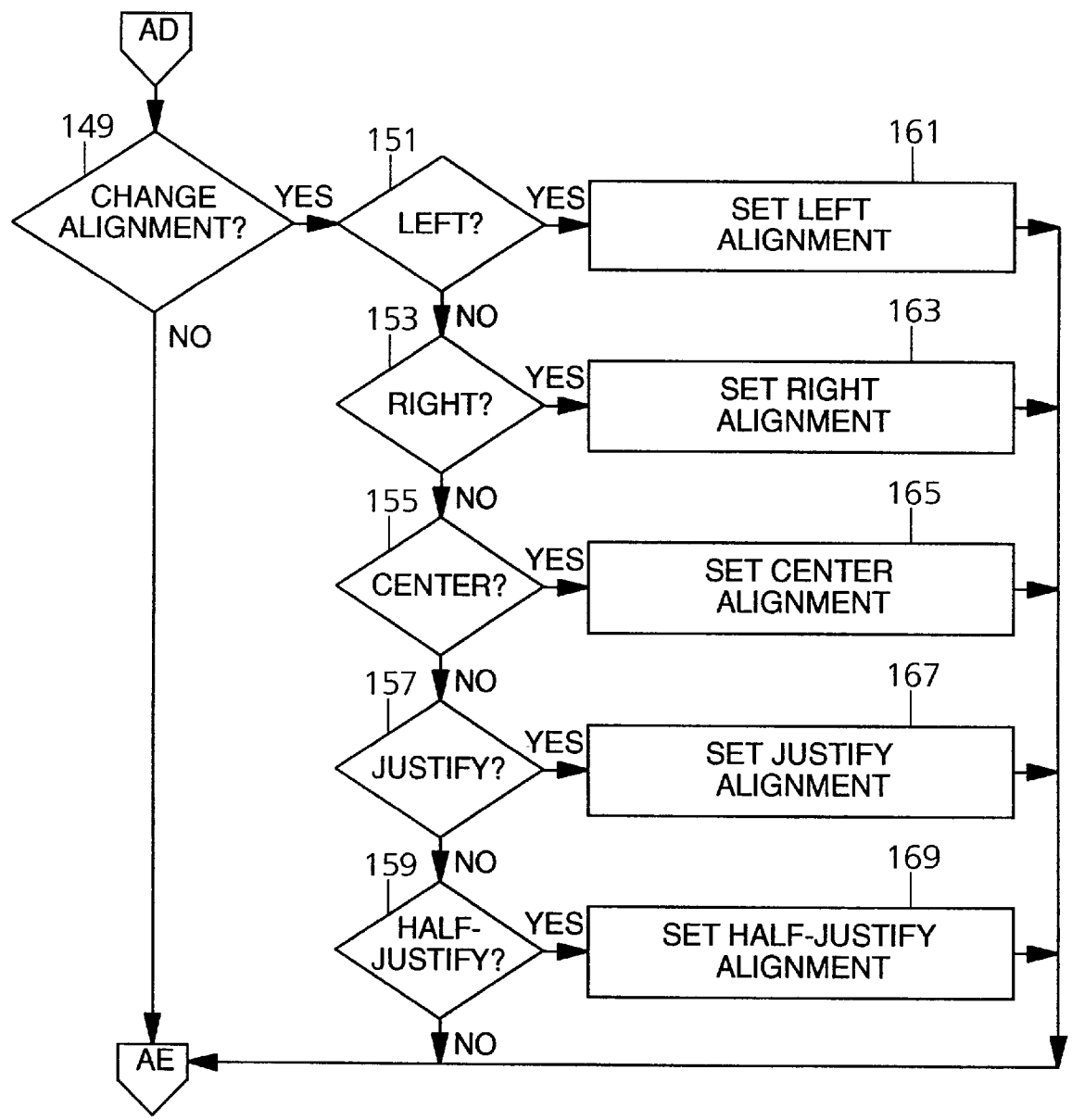

Referring to FIG. 3e, in step 149 the method determines if the user wishes to change the alignment of the side notes. This allows the user to determine how the side note text is positioned relative to the side note margins. If the result of step 149 is YES, then the method determines the particular alignment that the user desires, in steps 151–159. The user may select a left alignment, step 151, a right alignment, step 153, a center alignment, step 155, a justified alignment (wherein both the left and right sides of text are aligned), step 157, or a half-justified alignment (wherein the side note text is aligned to the left margin with a somewhat ragged right edge), step 159. Steps 161–169 set the appropriate alignment. Step 161 sets the left alignment, step 163 sets the right alignment, step 165 sets the center alignment, step 167 sets the justified alignment and step 169 sets the half-justified alignment. After setting the alignments, or if the result of step 149 is NO, then the method proceeds to step 171 in FIG. 3f.

Figure 3F:
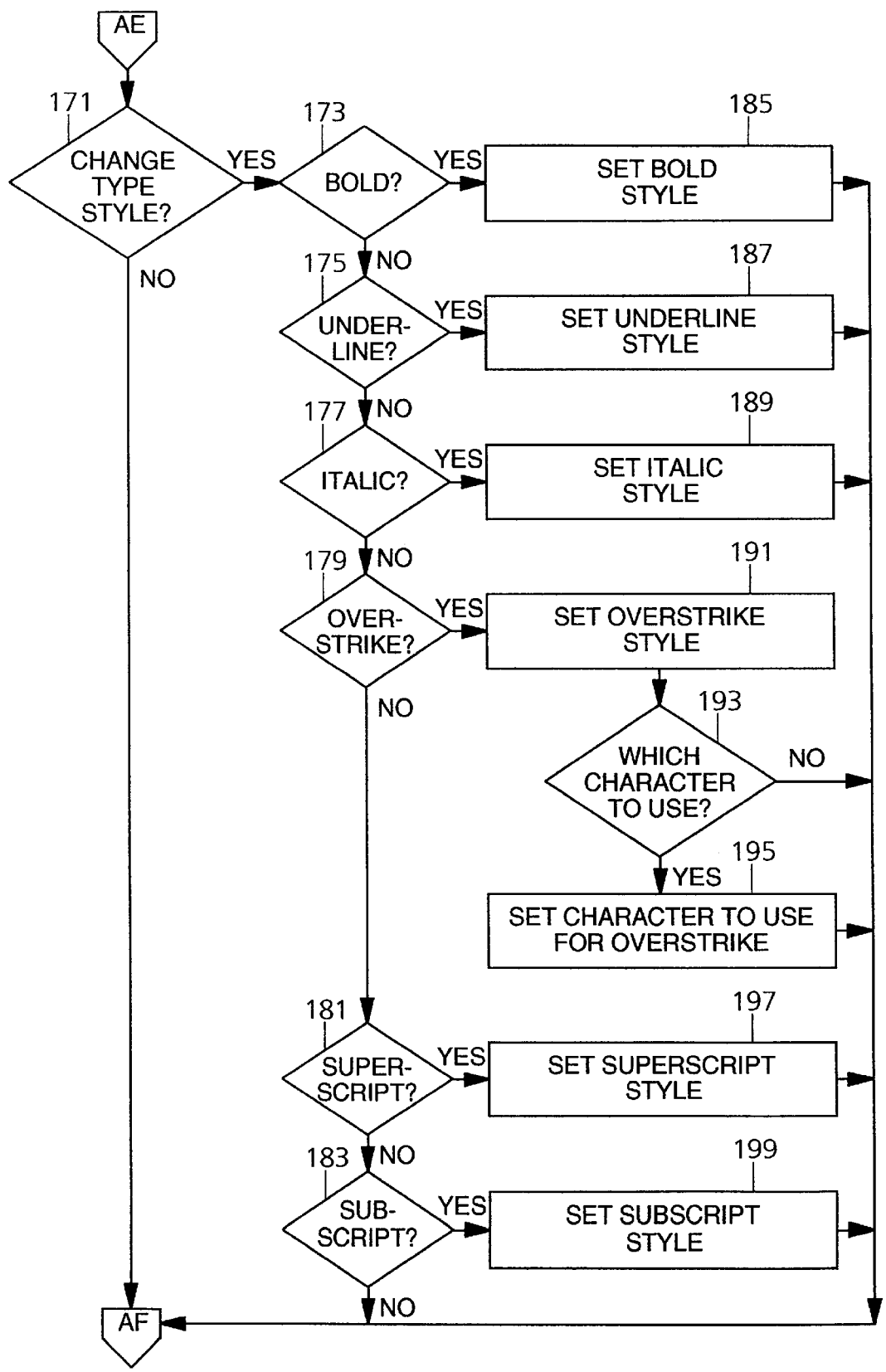

Referring to FIG. 3f, in step 171, the method determines if the user wishes to change typestyle. If the result of step 171 is YES, then the method proceeds to determine the specific typestyle desired by the user. The user can select a bold typestyle, step 173, underlining, step 175, italics, step 177, overstriking, step 179, superscript, step 181, and subscript, step 183. The method sets bold typestyle in step 185, underlining in step 187, italics in step 189, overstriking in step 191, superscript in step 197, and subscript in step 199. For the overstrike style, the user is allowed to determine which character is to be used for the overstriking, step 193. If the result of step 193 is YES, then in step 195, the character to use for overstrike is set to the user's selection. Such a character could be, for example, a slash or a dash. After setting the appropriate typestyle, or if the result of step 171 or step 193 is NO, then the method proceeds to step 201 in FIG. 3g.

Figure 3G:
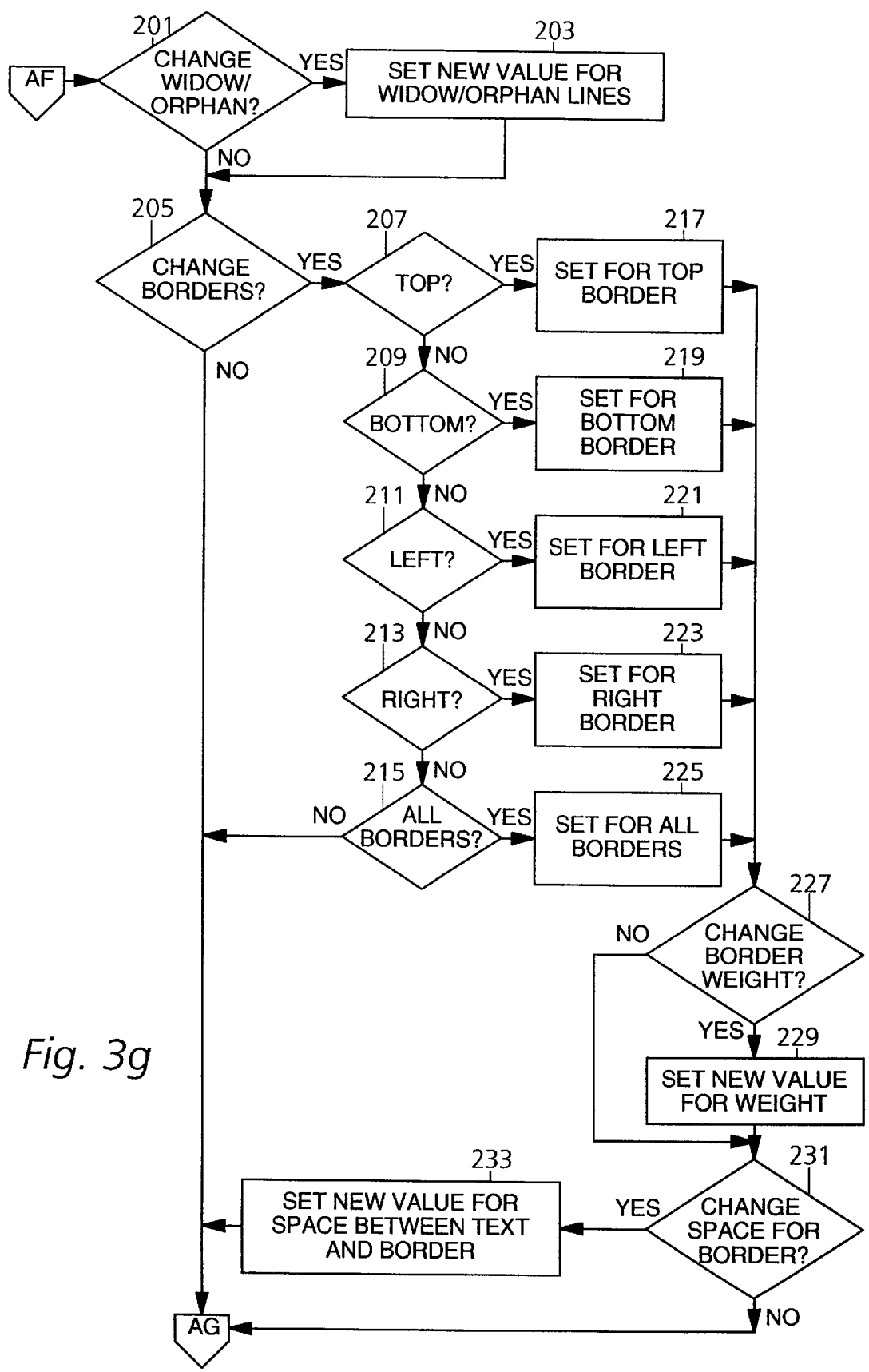

Referring to FIG. 3g, in step 201, the method determines if the user wishes to change widow/orphan values for the side note area. A widow is a single line at the top of a page, while an orphan is a single line at the bottom of a page. If the result of step 201 is YES, then in step 203 the method sets the new value for the widow and orphan lines. Thus, if the previous setting was to allow widows and orphans, the new setting would prohibit them and vice versa. Prevention usually involves putting two lines on the page. After step 203, or if the result of step 201 is NO, then the method proceeds to step 205.

In step 205, the method determines if the user wishes to change the borders of the side notes. Borders are lines around the side note area. If the result of step 205 is YES, then the method allows the user to change the top border, step 207, the bottom border, step 209, the left border, step 211, the right border, step 213, or all borders, step 215. In step 217, the top border is set, in step 219, the bottom border is set, in step 221, the left border is set, in step 223, the right border is set, and in step 225, all borders are set. After steps 217–225, the method determines if the border weight is to be changed, step 227. The border weights is the width of the border line. If the result of step 227 is YES, then in step 229, the method sets the new value for the border weight. After step 229, or if the result of step 227 is NO, then the method determines if the user wishes to change the spacing between the side note text and the border, step 231. If the result of step 231 is YES, then in step 233 the new value for the space between the text and the border is set. After step 233, or if the result of step 205, step 215, or step 231 is NO, then the method proceeds to step 234 in FIG. 3h.

Figure 3H:
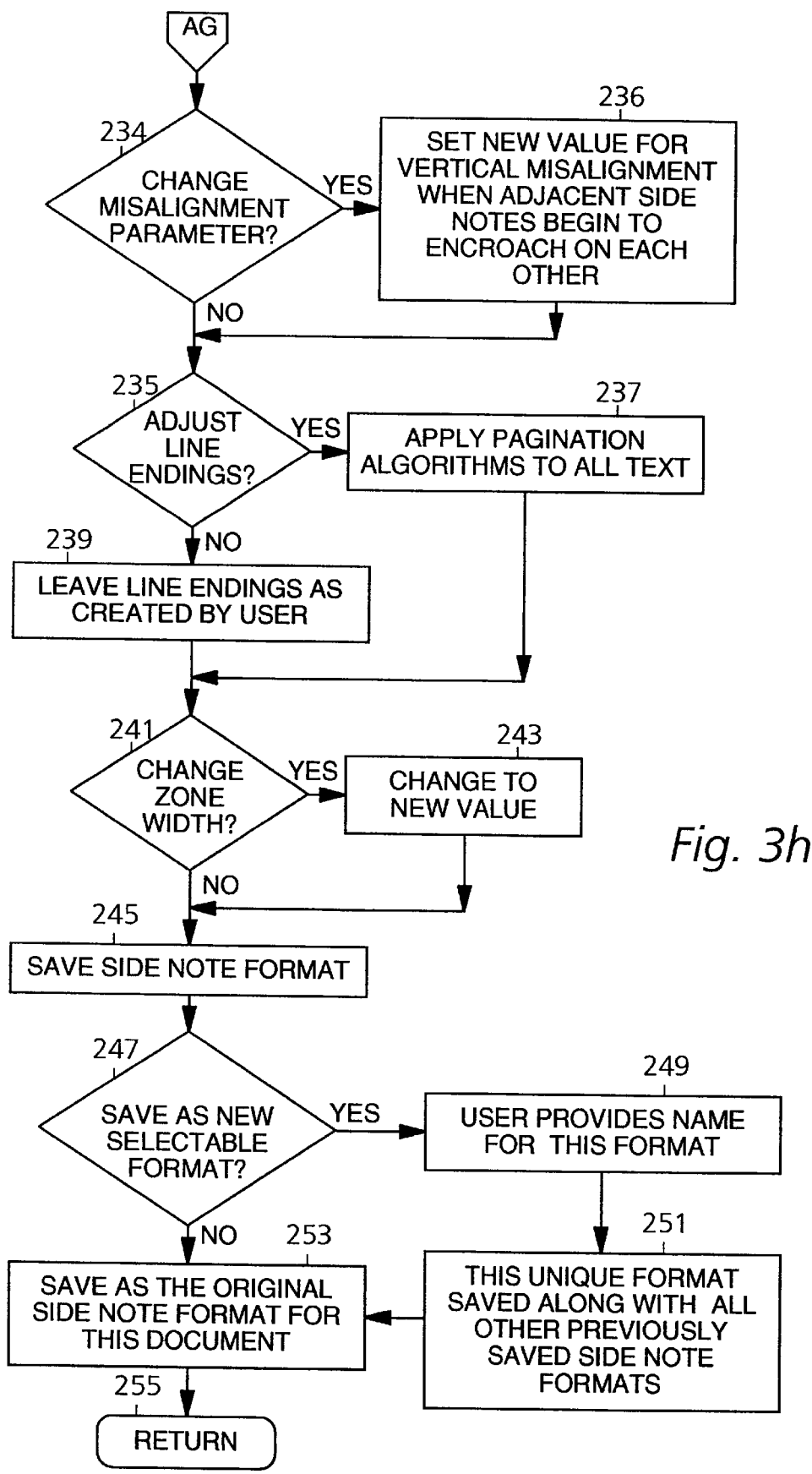

Referring to FIG. 3h, in step 234, the method determines if the user wishes to change a misalignment parameter. This parameter provides the maximum number of lines a side note can be located from the body text line containing its marker. If two or more side notes are associated with the same line of body text, then there is competition for the side margin space. A YES resulting from step 234 allows a user to set a new value for vertical misalignment when adjacent side notes begin to encroach on each other, step 236. An infinite setting would maintain the side notes on the same page. After step 236, or if the result of step 234 is NO, then the method proceeds to step 235.

In step 235, the method determines if the user wishes to adjust line endings. The adjustment of line endings allows the side note lines to be adjusted to fit between the side note margins when the pages containing the body text are formatted. If the result of step 235 is YES, then in step 237, the method applies pagination algorithms to all text lines so as to maintain the side note text within the side note margins.

If the result of step 235 is NO, then in step 239, line endings are left as created by the user during formatting of the body text. After steps 237 and 239, the method proceeds to step 241.

In step 241, the method determines if the user wishes to change zone width. The zone width allows the user to determine the raggedness of the right edge of the side note text. If the zone width is narrow, then long words will be hyphenated. If the result of step 241 is YES, then in step 243 the zone width is changed to the user-provided value. After step 243, or if the result of step 241 is NO, then the method proceeds to step 245.

In step 245, the side note format as provided in the preceding steps is saved. In step 247, the method determines if the user wants to save the format as a new selectable format, which may be selected under step 49 in FIG. 2b. If the result of step 247 is YES, then in step 249, the user provides the name for this new format. In step 251, the unique format is saved along with all other previously saved side note formats. If the result of step 247 is NO, or after step 251, then in step 253 the original side note format for the document is saved. After step 253, the method returns, step 255.

Figure 4A:
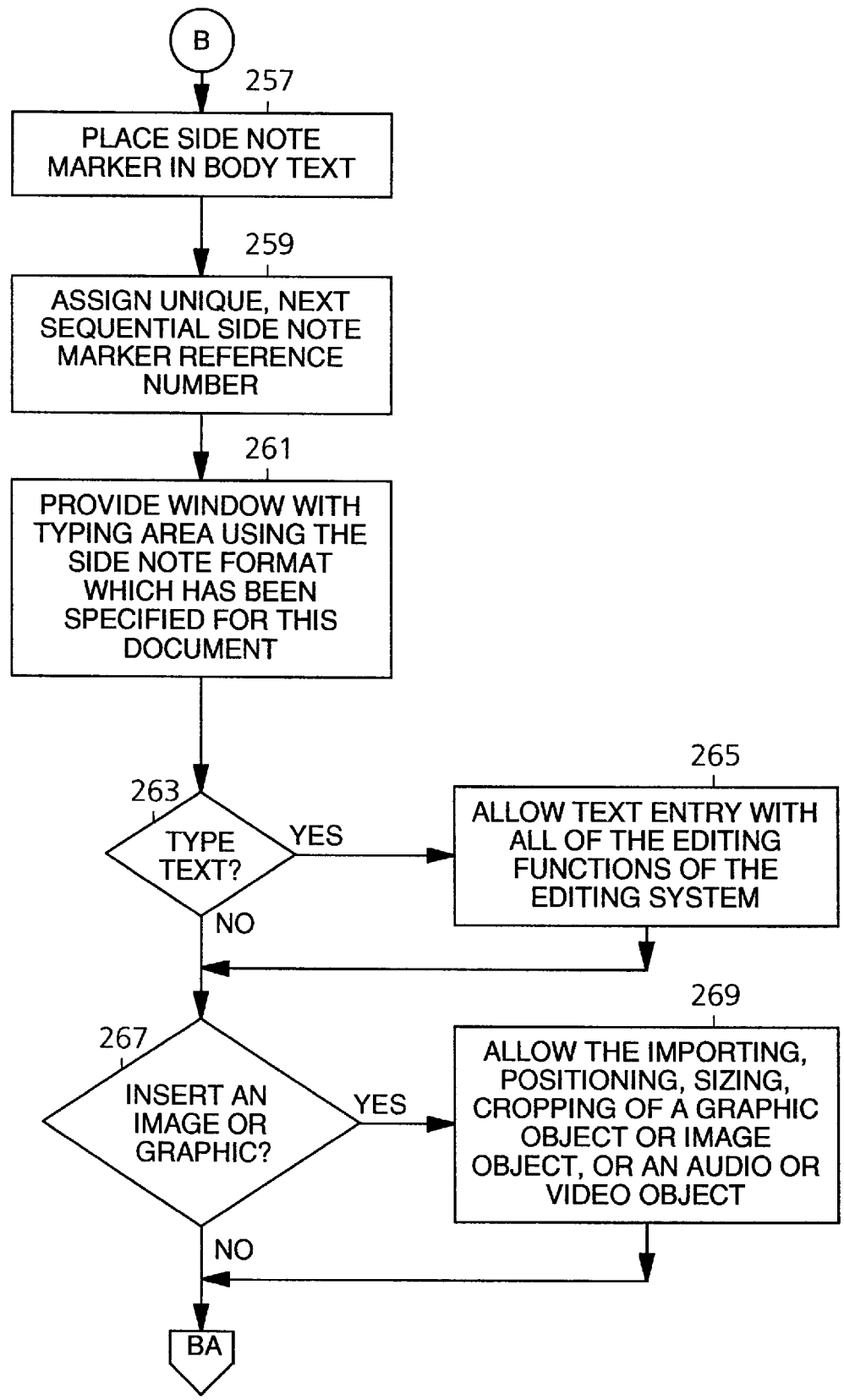
FIGS. 4a–4b show the flow chart for adding a side note.
Figure 4B:
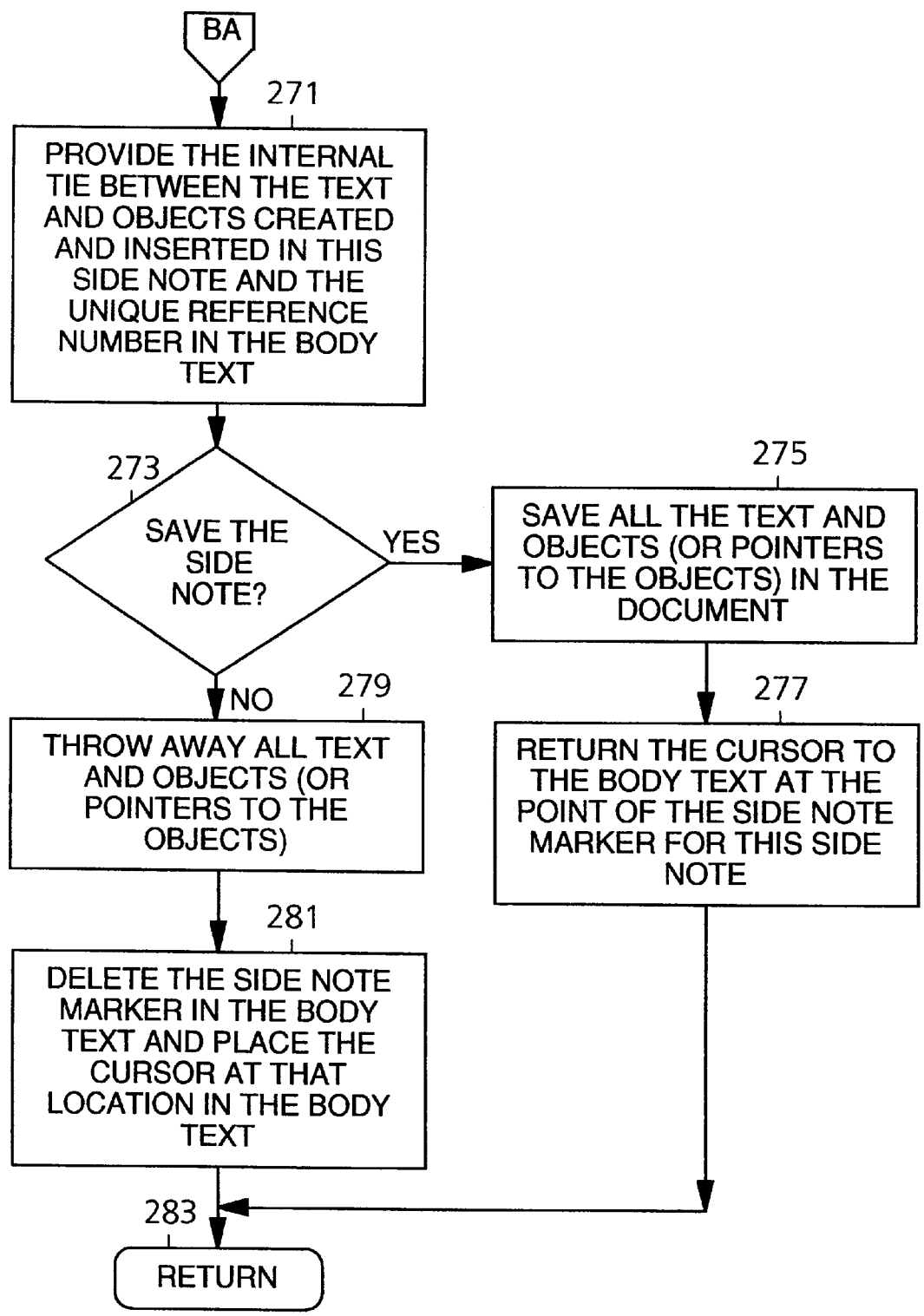

Referring now to FIGS. 4a and 4b, the method of adding a side note will be described. Referring first to FIG. 4a, the method places a side note marker in the body text, step 257. The method obtains the location of the side note marker from a user input. In the side note example given above, on page 1, the markers are shown by an "X". The user places the cursor in the body text at the desired location and uses a well known key to place the side note marker. The side note marker typically is not printed. However, it may be displayed on the screen to assist the user in editing functions. In step 259, the method designs a unique, next sequential reference number to the side note marker. In the first page of the example given above, the side note marker in the first paragraph could be assigned "1", the side note marker in the second paragraph could be assigned "2" and so on. In step 261, a window with typing area is provided. The window allows the use of the side note format that has been specified for the document. Alternatively, the same window that contains the document could be utilized to add a side note. The cursor would then be jumped over to the side margin adjacent to the body text containing the marker. In step 263, the method determines if the user wants to type text. If the result of step 263 is YES, then in step 265, text entry is allowed with all of the editing functions of the editing system. For example, the user could type in text using the keyboard, while the backspace and delete keys could be used to correct errors. Alternatively, portions of text from other files could be cut and pasted into the side note area. After step 265, or if the result of step 263 is NO, then the method proceeds to step 267.

In step 267, the method determines if the user wants to insert an image or graphic in the side note area. The contents of the side notes, like the contents of the body text, need not be limited to text, but can include non-text objects such as a graphic object, an image object, an audio object or a video object. If the result of step 267 is YES, then in step 269, a non-text object is inserted into the side note area. Step 269 allows the importing, positioning, sizing and cropping of the non-text object. After step 269, or if the result of step 267 is NO, the method proceeds to step 271 in FIG. 4b.

In step 271, an internal tie or association is provided between the side note text (and objects created and inserted in this side note) and the unique reference number designating the marker in the body text. In step 273, the method determines if the side note is to be saved. If the result of step 273 is YES, then in step 275 all of the text and objects (or the pointers to the objects) are saved in the document. In step 277, the cursor is returned to the body text at the point of the side note marker for this particular side note. If the result of step 273 is NO, then all of the side note text and objects (or pointers to the objects) are thrown away. In step 281, the side note marker in the body text is deleted and the cursor is placed at that location in the body text. The method then returns, step 283.

Figure 5:
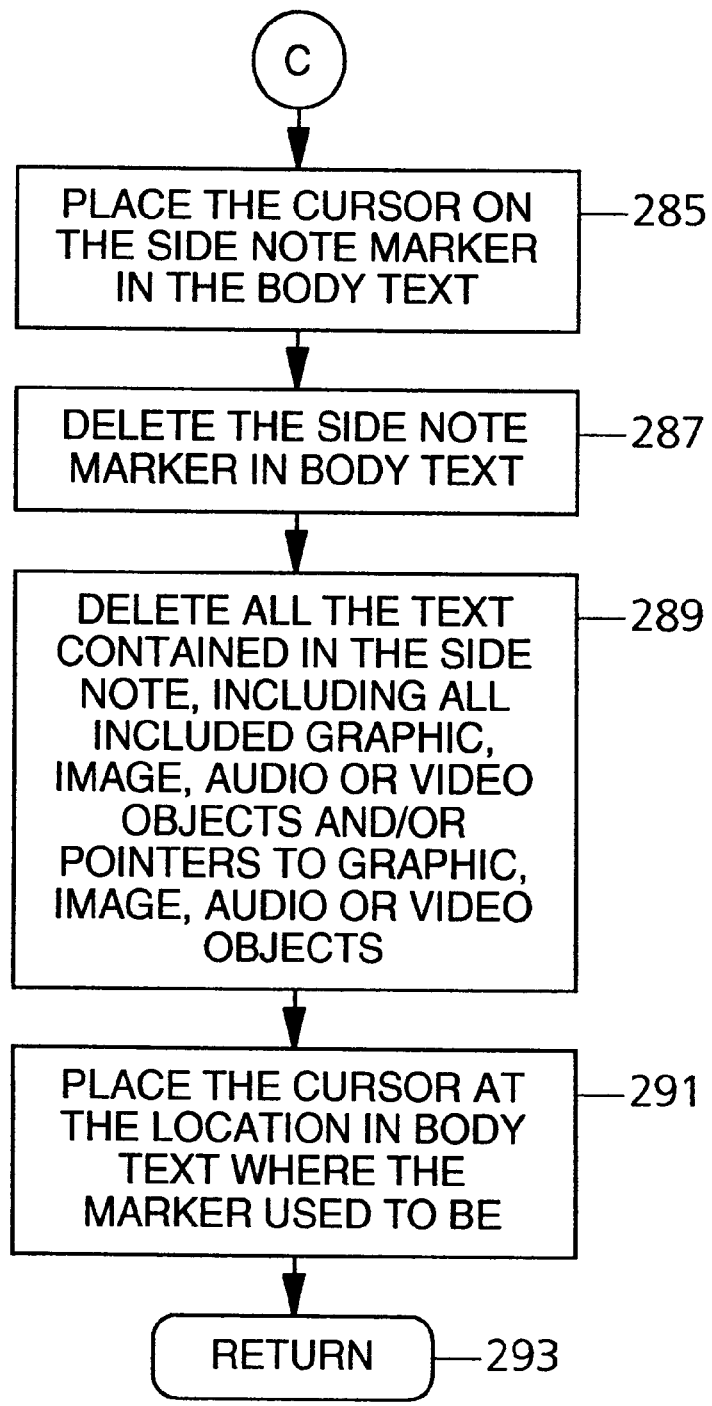

Referring now to FIG. 5, the method for deleting a side note will now be described. In step 285, the user places the cursor on the side note marker in the body text. In step 287, the user presses a well known key to delete the side note marker from the body text. In step 289, all of the text contained in the side note, along with any non-text objects is deleted. The deletion also includes pointers to the non-text objects. Then, the cursor is placed at the location in the body text where the marker used to be, step 291. In step 293, the method returns.

Figure 6A:
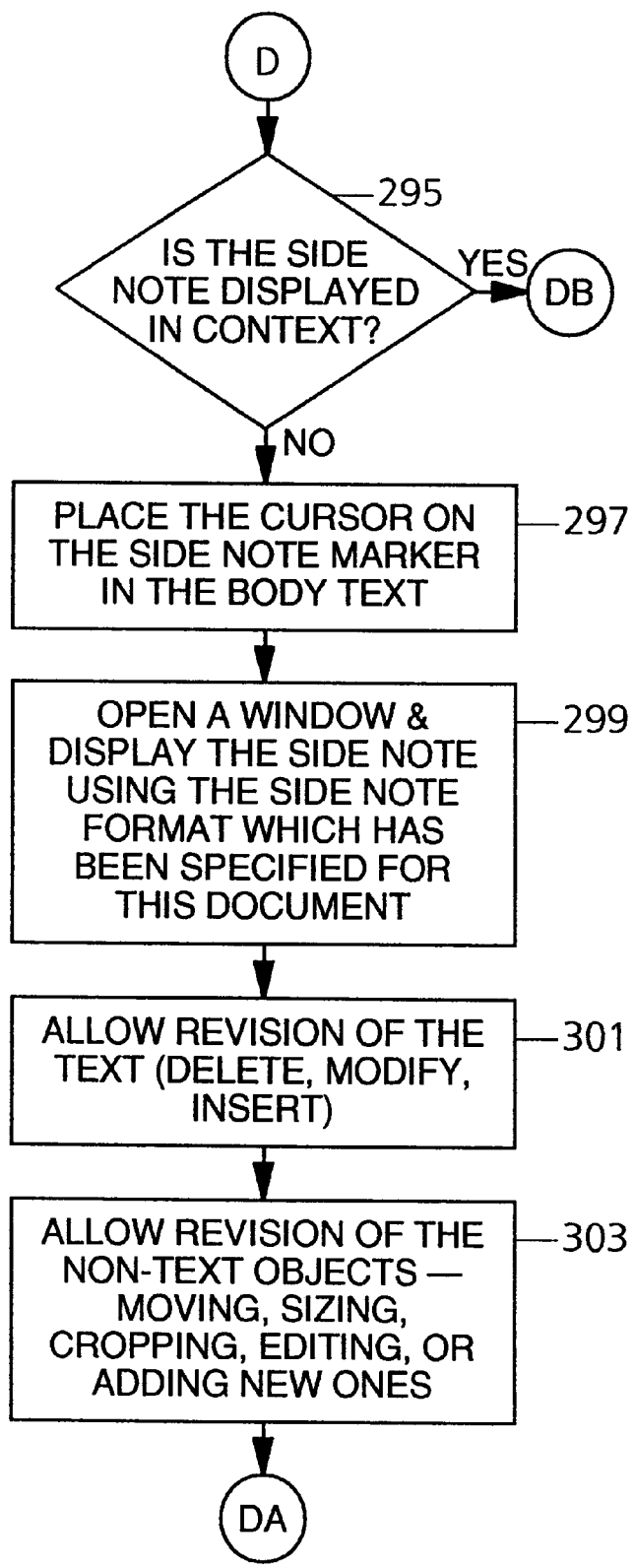
FIGS. 6a–6c show the flow chart for modifying a side note.
Figure 6B:
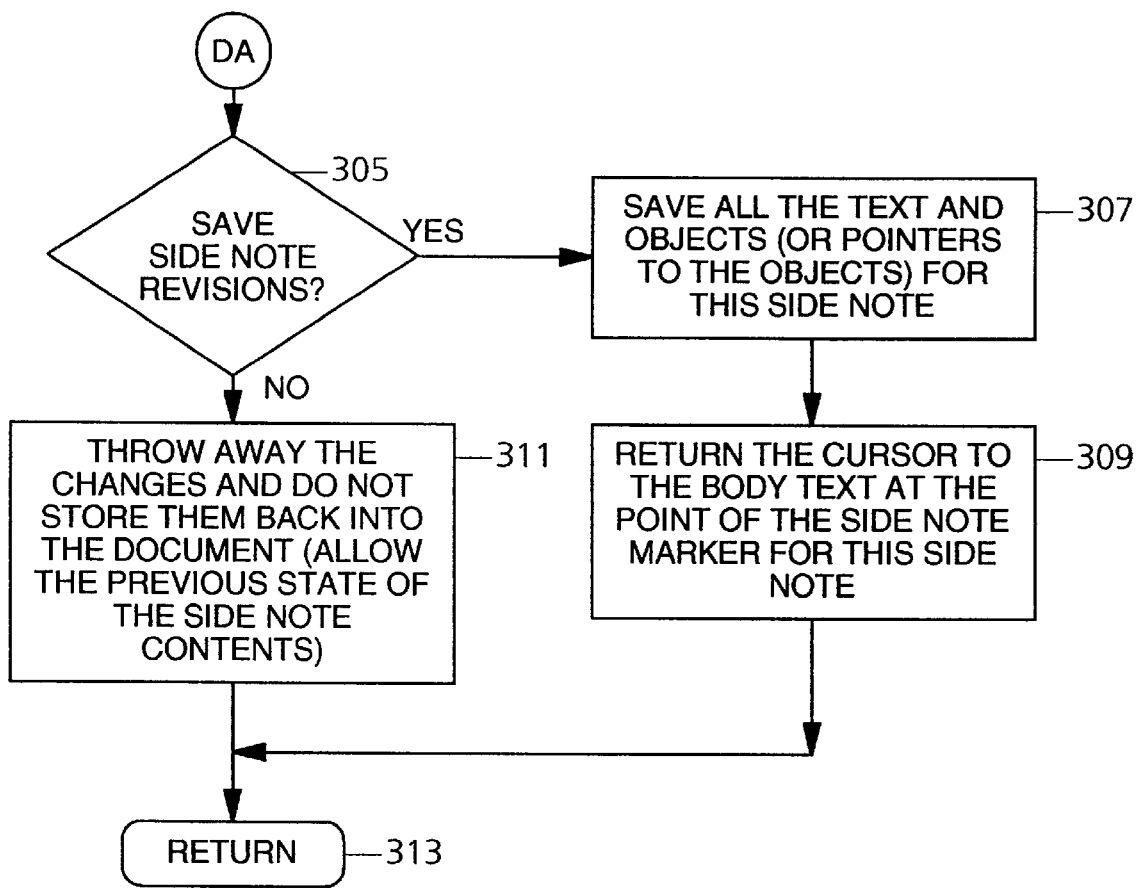
Figure 6C:
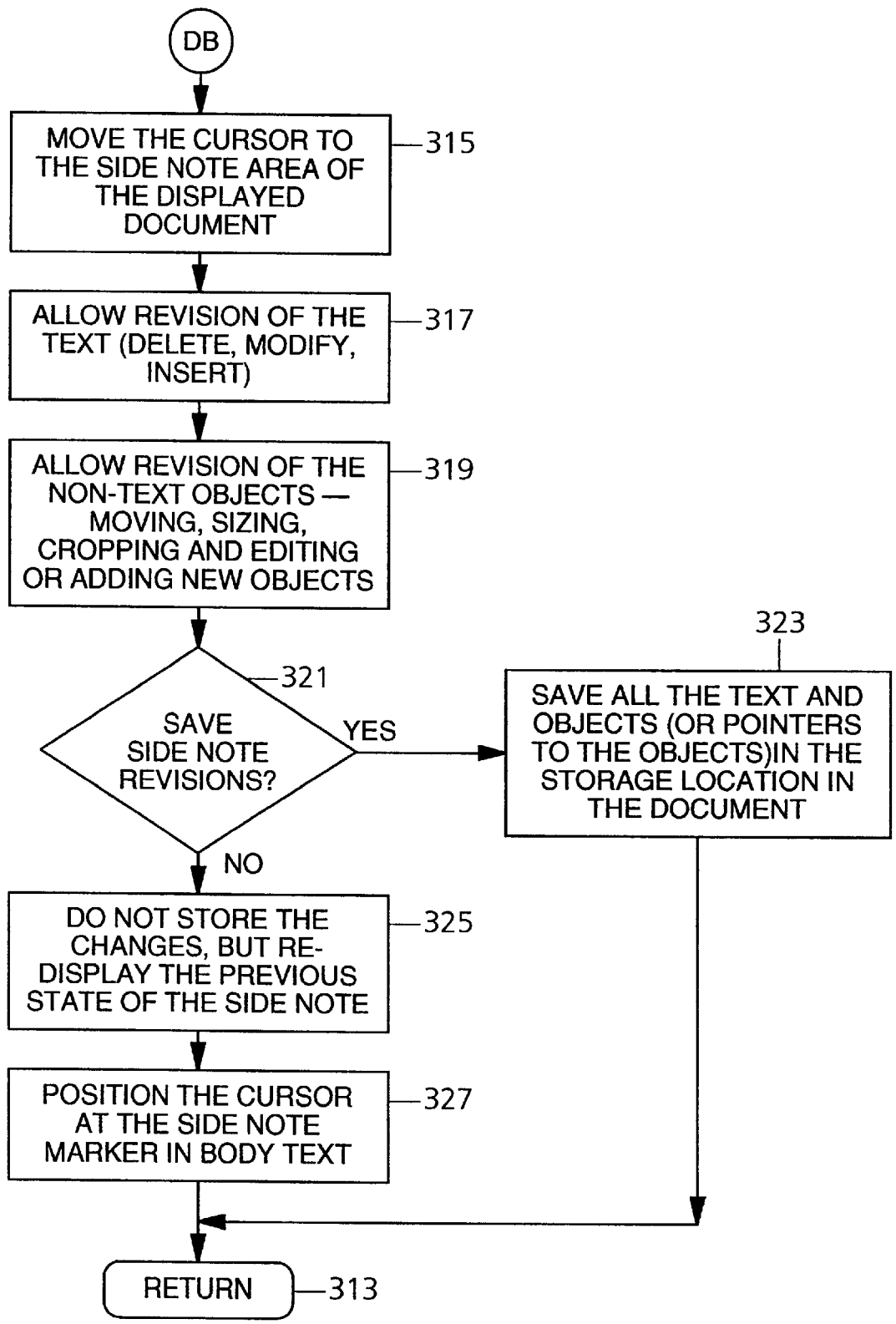

Referring to FIGS. 6a–6c, the method for modifying an existing side note will be described. In step 295 of FIG. 6a, the method determines if the side note is displayed in context. That is, the method determines if the side note is displayed along the side of the body text containing the marker. If the result of step 295 is NO, then the method proceeds to step 297, wherein the user places the cursor on the side note marker in the body text. In step 299, a window is opened and the side note is displayed in the window. The side note is displayed using the side note format that has been specified for the document. In step 301, user inputs are allowed to revise the text. Such user inputs include deleting, modifying and inserting text. In step 303, user inputs for revising the non-text objects are allowed. Such inputs include moving, sizing, cropping, editing or adding new non-text objects. The method proceeds to step 305, FIG. 6b.

In step 305, the method determines if the user wants to save the revisions to the side note. If the result of step 305 is YES, then in step 307 all of the text and non-text objects (or pointers to the objects) for this side note are saved. In step 309, the cursor is returned to the body text at the point of the side note marker for this particular side note. If the result of step 305 is NO, then the changes to the side note are thrown away and not stored in the document. Instead, the side note, as unrevised before the attempted modification, is retained in the document. After steps 309 and 311, the method returns, step 313.

If the result of step 295, in FIG. 6a, is YES, then the method proceeds to step 315 in FIG. 6c. In step 315, the cursor is moved to the side note area of the displayed document. The side note area is in the side margin adjacent to the body text containing the side note marker. Thus, the cursor is shifted from the body text to the side note. In step 317, user inputs are received for revising the text. Such inputs include deleting, modifying or inserting text. In step 319, user inputs for revising the non-text objects are received and processed. Such revision inputs include moving, sizing, cropping and editing or adding new objects. In step 321, the method determines if the side note revisions are to be saved. If YES, then in step 323, all the text and objects (or pointers to the object) are saved. If the result of step 321 is NO, then in step 325, the changes are not stored. Instead, the side note, as unmodified before the attempted modifications, is redisplayed. In step 327, the cursor is positioned at the side note marker in the body text. After steps 323 and 327, the method returns, step 313.

Figure 7A:
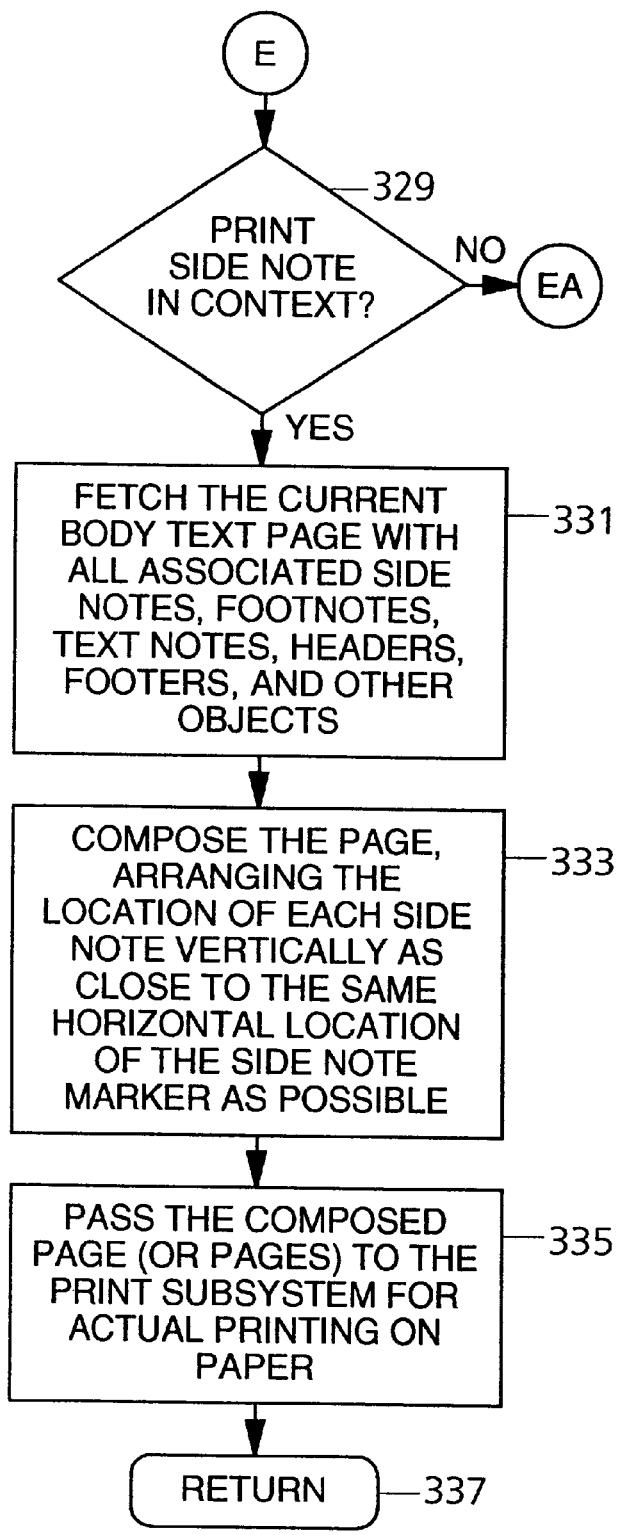
FIGS. 7a–7b show the flow chart for printing a side note.
Figure 7B:
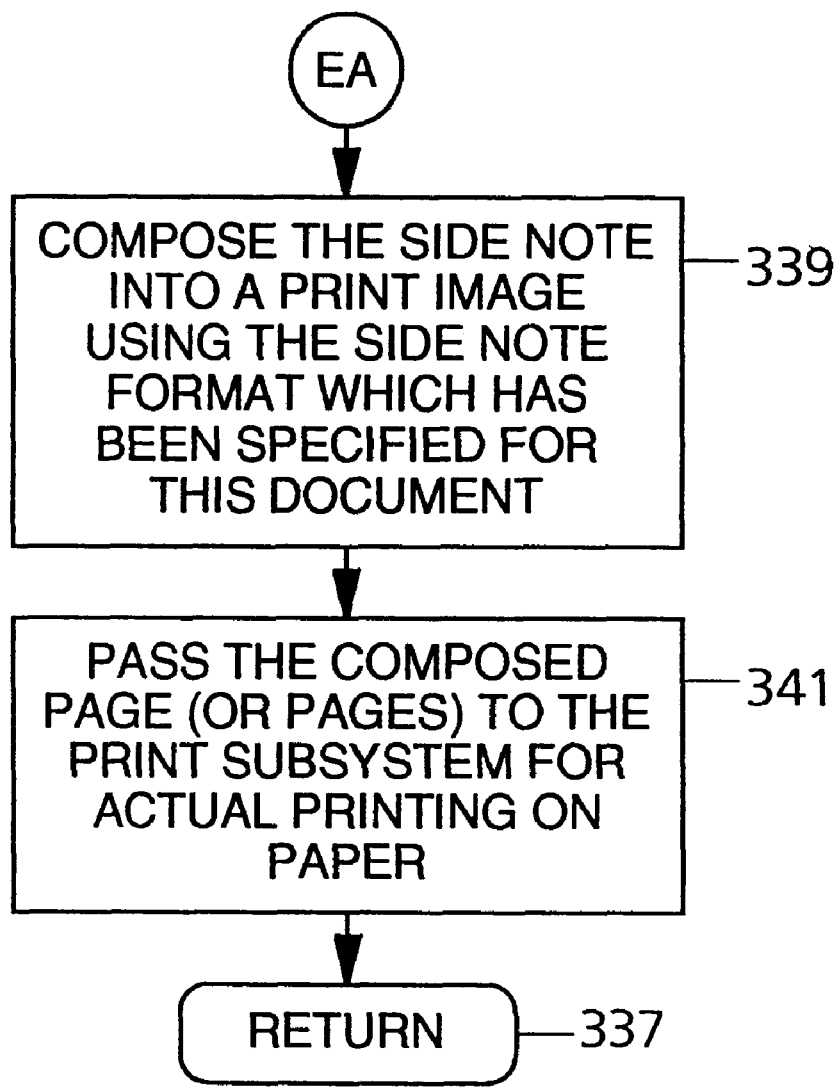

Referring now to FIGS. 7a and 7b, the method of printing a side note will be described. In step 329 of FIG. 7a, the method determines if the user wants to print a side note in context. Printing a side note in context prints the body text as well as the associated side notes in the desired formats. If the result of step 329 is YES, then in step 331, the current body text page is fetched, along with all of the associated side notes, footnotes, text notes, headers, footers and other objects. In step 333, the page is composed, arranging the location of each side note vertically in the side margin as close to the same horizontal location of the side note marker as possible. The misalignment parameter of step 236 is used in determining the location of each side note if needed. In step 335, the composed page or pages are passed to the printing subsystem for actually printing on paper. The method then returns in step 337.

If the result of step 329 is NO, so that the side note will not be printed in context, then the method proceeds to step 339 of FIG. 7b. In step 339, the side note is composed into a print image using the side note format which has been specified for the particular document. In step 341, the composed page or pages are passed to the printing subsystem for actually printing on paper. The composed page will contain just the side note, and not the body text. After step 341, the method returns, step 337.

Figure 8:
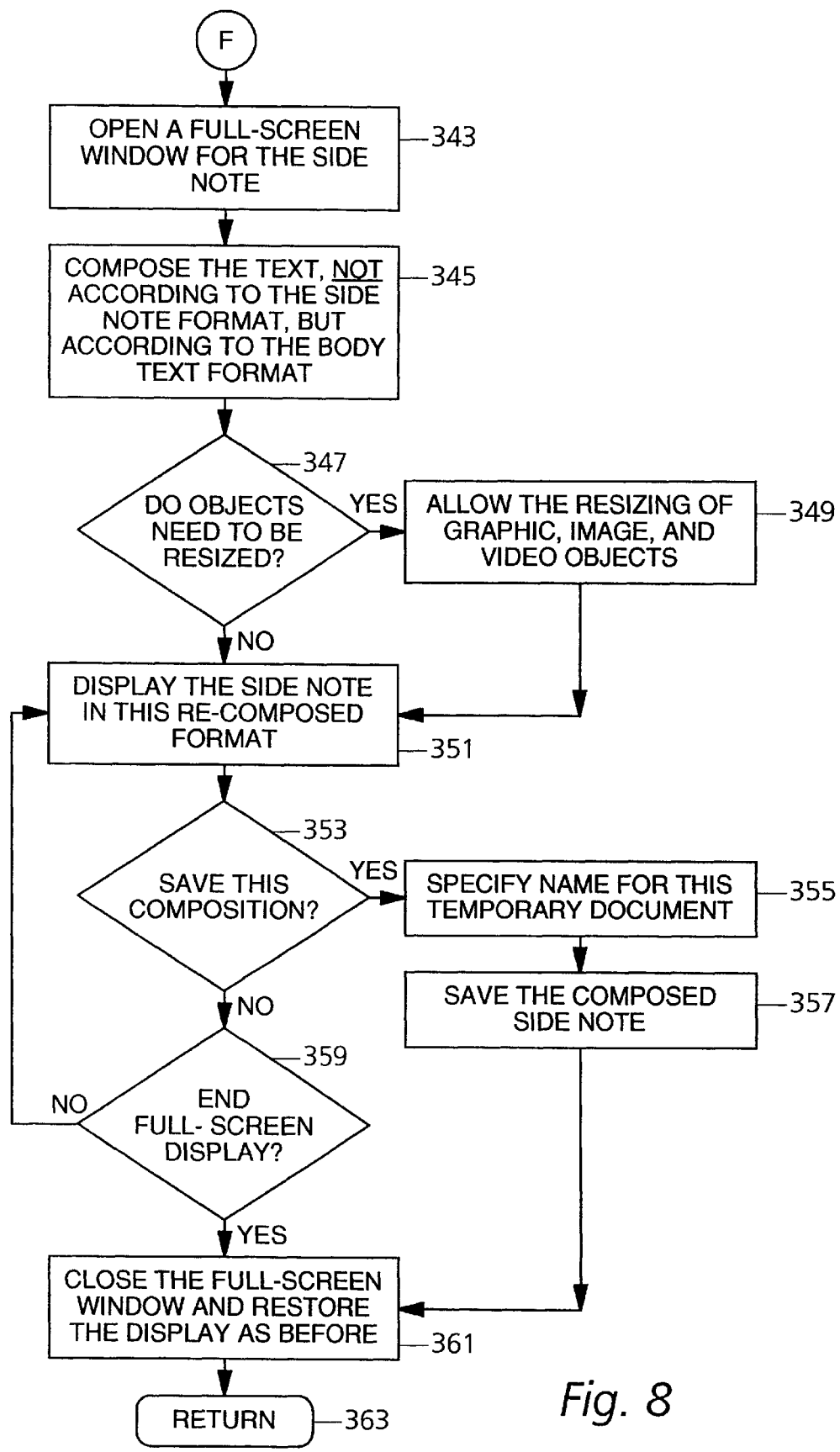

Referring now to FIG. 8, the method of displaying a side note in full screen will be described. That is, the side is displayed by itself, without the body text. In step 343 of FIG. 8, a full screen window is opened for the side note. In step 345, the text of the side note is composed according to the body text format, instead of according to the side note format. In step 347, the method determines if non-text objects in the side note need to be resized. If the result of step 347 is YES, then in step 349, any graphic, image or video objects are resized. After step 349, or if the result of step 347 is NO, then the method proceeds to step 351. In step 351, the side note is displayed in the recomposed format. Text is displayed in the body text format, while non-text objects are displayed in their new sizing. In step 353, the method determines if the user wishes to save this composition. If the result of step 353 is YES, then in step 355, the user specifies a name for this temporary document. In step 357, the composed side note is saved under the specified name. If the result of step 353 is NO, then in step 359 the method determines if the user wishes to end the full screen display. If the result of step 359 is NO, then the method returns to step 351. If the result of step 359 is YES, then the method proceeds to step 361. Likewise, after step 357, the method proceeds to step 361. In step 361, the full screen window is closed and the previous display is restored. The method returns in step 363.

Figure 9:
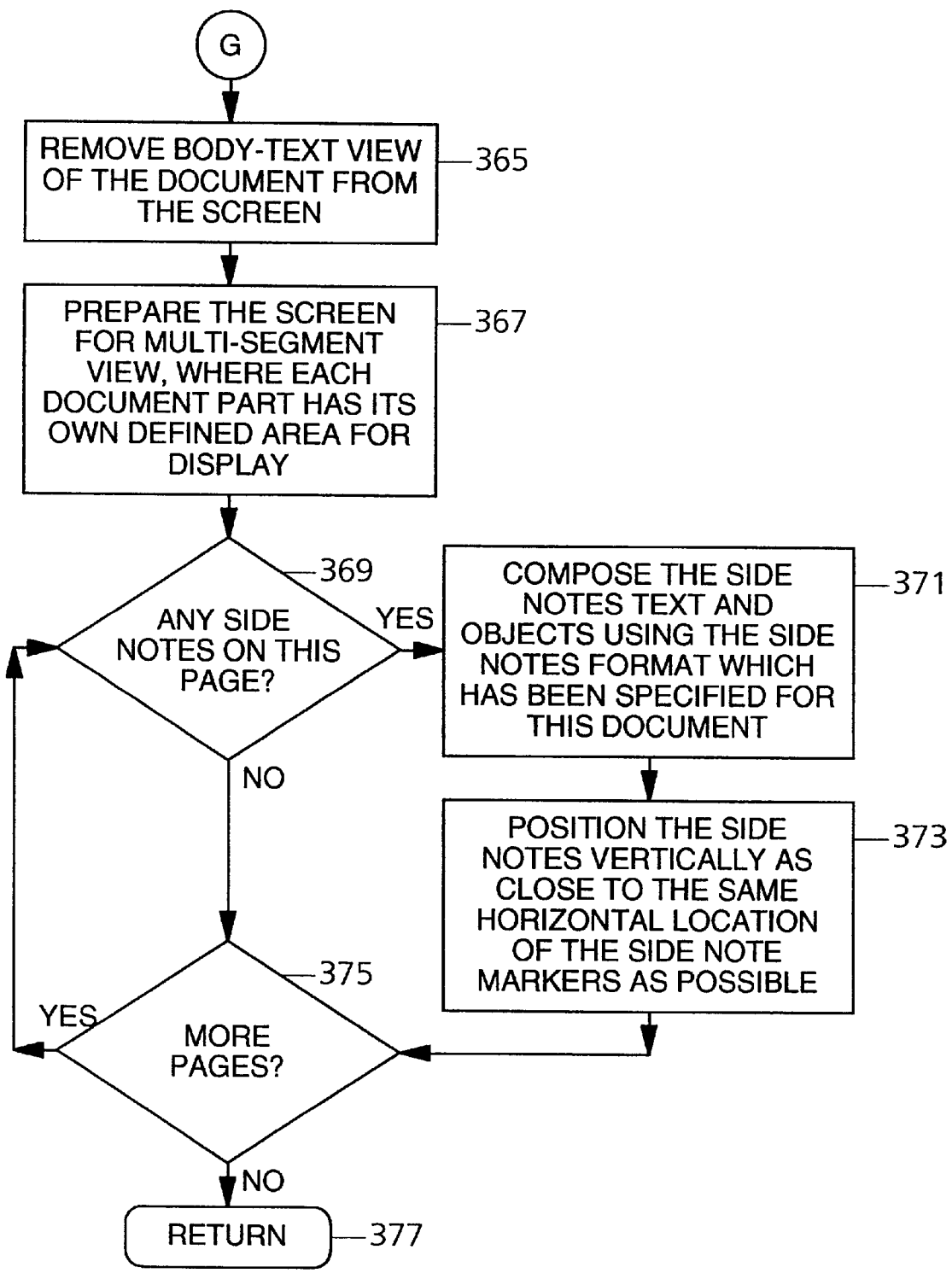

Referring now to FIG. 9, the method of displaying side notes in context will be described. Displaying side notes in context allows a user to view on the screen 17 the side note in a side margin of the body text. In the method of FIG. 9, it is assumed that the user is not viewing the document with the side note in context, but that the user wishes to change the display to view the side note in context. In step 365, the body text view of the document is removed from the screen. In step 367, the screen 17 is prepared for a multisegment view. Each document part, that is the body text part and the side note part has its own defined area for display. In step 369, the method determines if there are any side notes on the page which is to be displayed. If the result of step 369 is YES, then in step 371, the side note text and objects are composed, using the side note format which has been specified for this document. In step 373, the side note or notes are positioned vertically as close as possible to the same horizontal location of the side note marker or markers as possible using the misalignment parameter of step 236. After step 373, or if the result of step 369 is NO, then the method proceeds to step 375. In step 375, the method determines if there are more pages. If the result of step 375 is YES, then the method returns to step 369. If the result of step 375 is NO, then the method returns, step 377.

Figure 10:
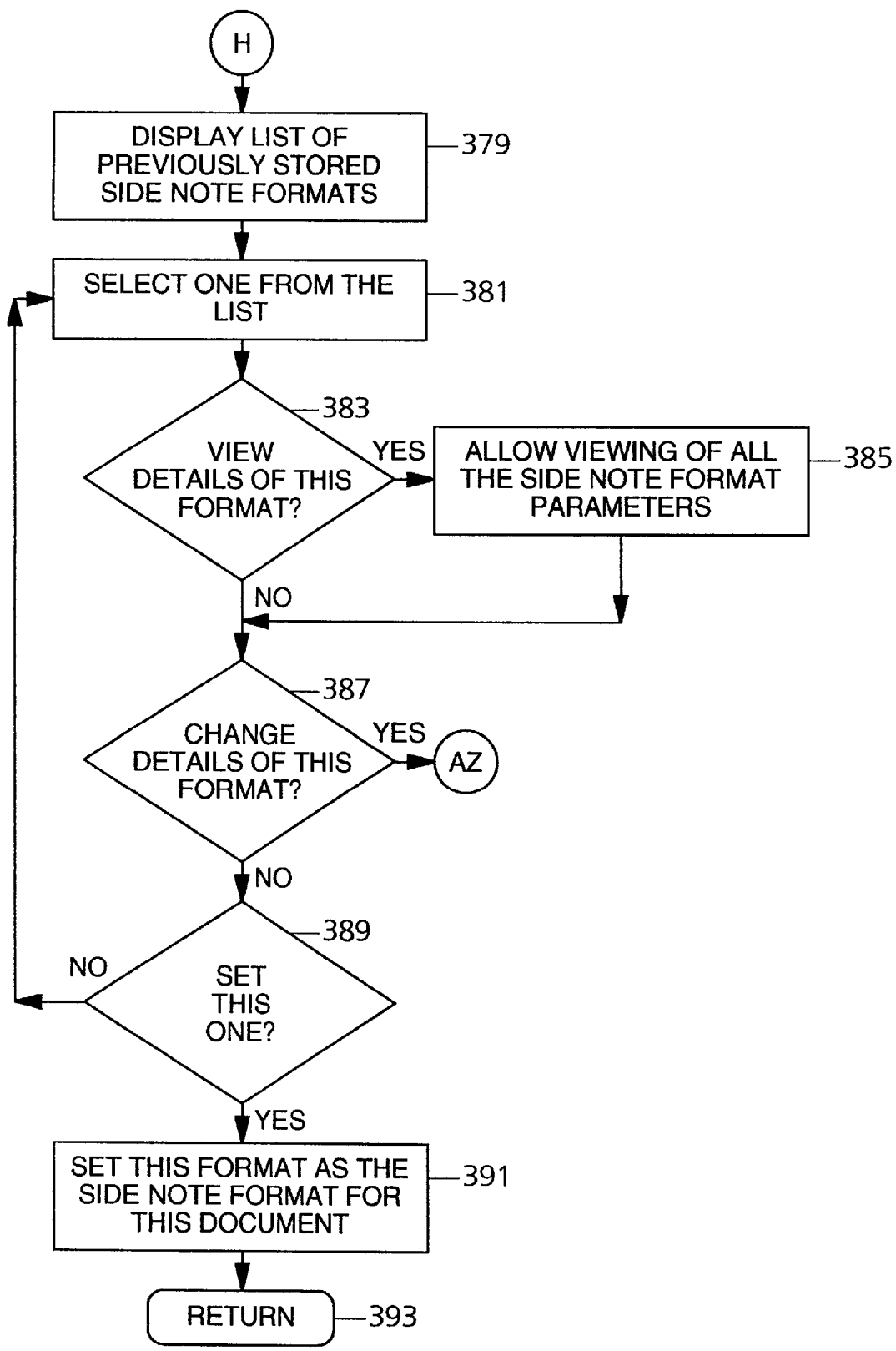

Referring now to FIG. 10, the method of selecting a side note format will be described. This method allows the user to select and modify the format for side notes in a particular document. In step 379, a list of previously stored side note formats is displayed. These previously stored side note formats can be provided by the user using the method of FIGS. 3a–3h, or alternatively can be provided in library form. In step 381, the user selects one of the formats from the list. In step 383, the method determines if the user wishes to view the details of the selected format. If the result of step 383 is YES, then in step 385, the method allows viewing of all of the side note format parameters. After step 385, or if the result of step 383 is NO, the method proceeds to step 387. In step 387, the method determines if the user wishes to change the details of the selected format. If the result of step 387 is YES, then the method proceeds to step 59 of FIG. 3a, to allow the user to edit the format. If the result of step 387 is NO, then the method proceeds to step 389 to determine if the user wishes to set the selected format as the format for the side notes in the document. If the result of step 389 is NO, then the method returns to step 381 to allow the user to select another format. However, if the result of step 389 is YES, then in step 391 the selected format is set as the side note format for the particular document. Then, in step 393, the method returns.

Figure 11:
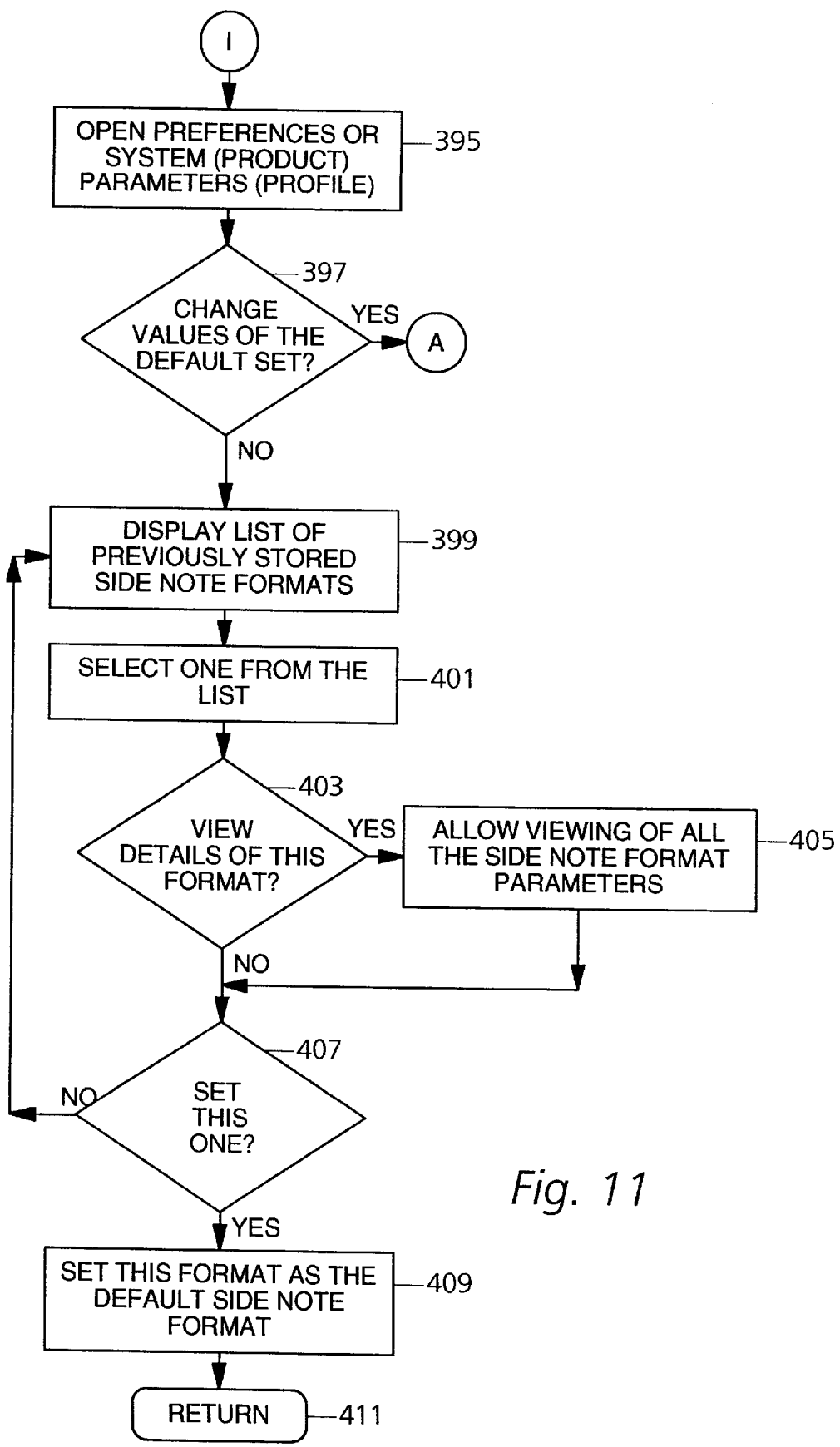

Referring now to FIG. 11, the method of setting a default side note format will be described. The default format is used for the side notes in the absence of a user selection of a specific side note format. In step 395, the preferences or system parameters are opened. In step 397, the method determines if the user wishes to change values of the default set. If the result of step 397 is YES, then the method proceeds to step 57 of FIG. 3a to allow the user to change the parameters of the default format. If the result of step 397 is NO, then the method proceeds to step 399 to display a list of previously stored side note formats. In step 401, the user selects one of the formats from the list. In step 403, the method determines if the user wishes to view the details of the selected format. If the result of step 403 is YES, then in step 405 the method allows viewing of all of the side note format parameters. After step 405, or if the result of step 403 is NO, the method proceeds to step 407. In step 407, the method determines if the user wishes to set the selected format. If the result of step 407 is NO, then the method returns to step 399. If the result of step 407 is YES, then in step 409 the method sets the selected format as the default side note format. In step 411, the method returns.

Referring back to FIG. 2c, the method of deleting all of the side notes will now be described. Deletion of all side notes is invoked by a YES result from step 53, wherein step 421 is performed. In step 421, the method deletes all text and all non-text objects in all of the side notes. In step 423, all of the reference markers to the side notes that are in the body text are deleted. In step 425, the method determines if the document format is to be restored. If YES, then the document format parameters are set so as to reclaim the unused side note space. This typically involves moving the margin (that was adjacent to the side notes) of the body text over to the location of the previous side note left margin. After step 427, or if the result of either of steps 53 or 425 is NO, then the method proceeds to step 55 in FIG. 2d.

As described above, in step 55 of FIG. 2d, the main method determines if the user wishes to revise the body text. If the result of step 55 is YES, then the main method proceeds to step 431 to allow revision of the body text, while maintaining the side notes adjacent to the respective associated body text portions. In step 431, the method allows adding, deleting, copying and inserting text and non-text objects in the body text. After the revisions have been completed, in step 433, the method recomposes the page taking the revisions into account using the format for the body text. In step 435, the method determines if there is a side note marker in the body text. If NO, then the composed page is displayed on the screen 17 (or printed), step 437. The method then returns, step 56. If the result of step 435 is YES, there is a side note marker in the body text, then the method proceeds to step 441 in FIG. 12a.

The method of FIGS. 12a–12d recompose the side notes in the side margins so as to keep the side notes as close as possible to the line of body text containing the associated marker. In step 441, the method accesses the side note information (text or non-text objects that make up the side note) for the side note using the side note marker reference number. In step 443, the side note is recomposed using the side note format parameters. The side note information is positioned so that the top of the side note information is adjacent to the body text line that contains the side note marker. For example, if the marker is moved during body text revisions from line 9 to line 10 of the body text, then the associated side note is moved down one line to line 10 of the side note area.

As the side note is recomposed, any carry over side note information from the previous page is taken into account. For example, if a side note marker is contained in the first line of a page, and if there is no carry over side note information from the previous page, then the side note for the marker would begin in the first line in the side note area. However, if there is carry over from the previous page, then the side note would be moved down one or more lines along the side note area to accommodate the carry over side note information.

In step 445, the method determines if this is the last side note marker on the page. If the result of step 445 is NO, then in step 447, the method finds the next side note marker in the body text on this page. The method then returns to steps 441 et seq. wherein the side note is recomposed.

Figure 12A:
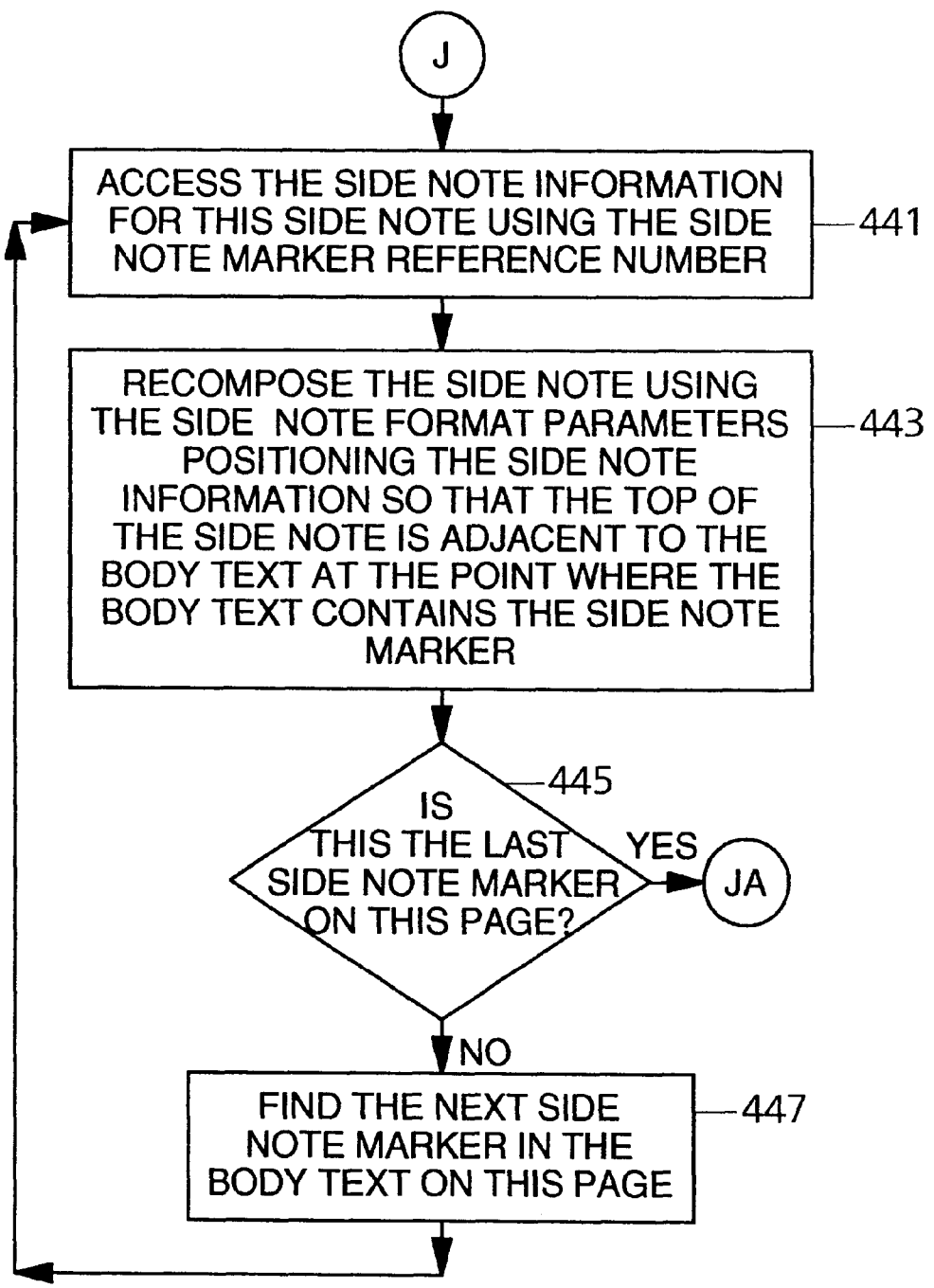
Figure 12B:
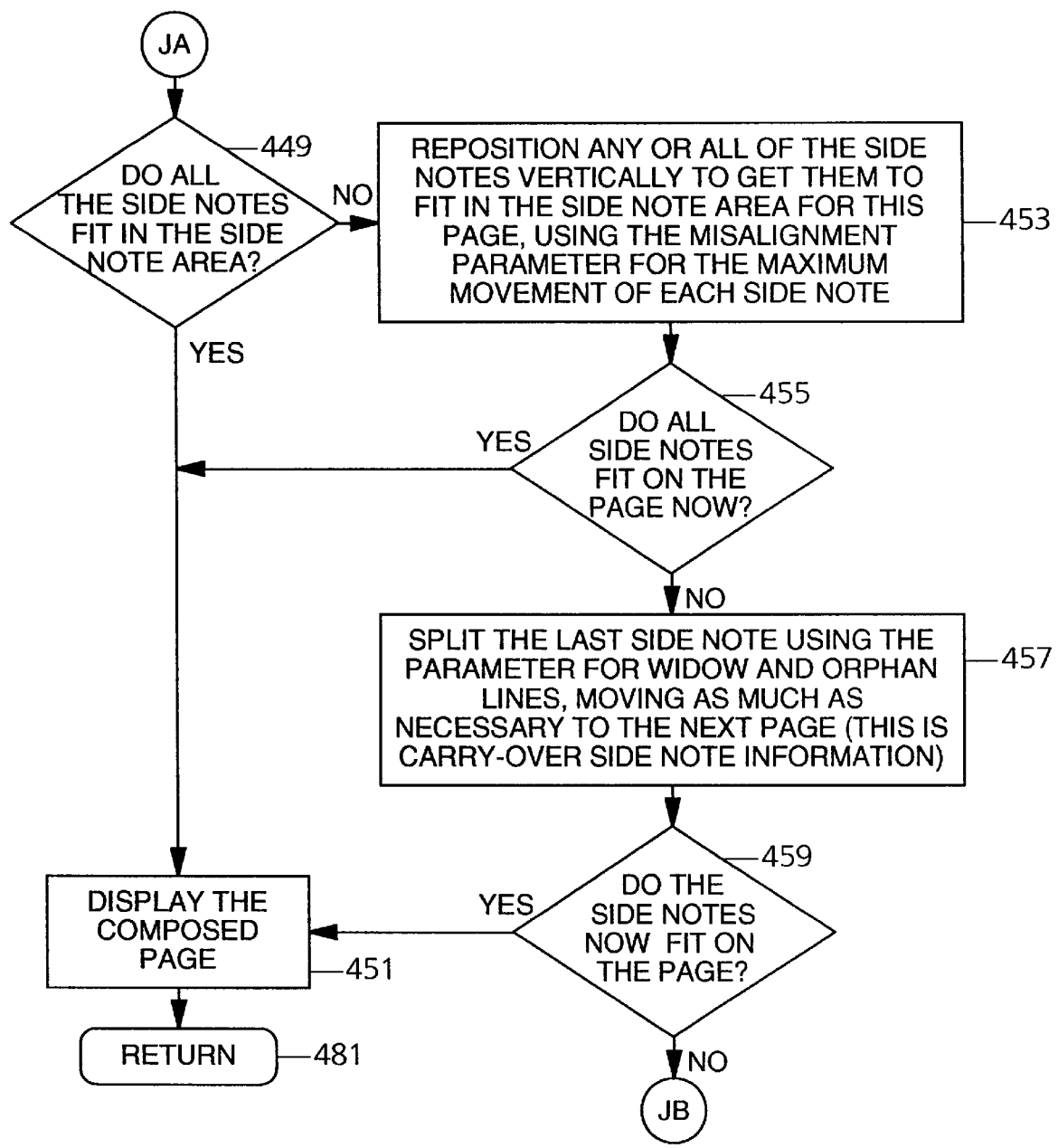

If the result of step 445 is YES, then the method proceeds to step 449, FIG. 12b. In step 449, the method determines if all of the side notes on the page fit into the side note area. If the result of step 449 is YES, then in step 451 the composed page is either displayed or printed. After step 451, the method returns, step 481. However, if the result of step 449 is NO, then in step 453 the method repositions any or all of the side notes vertically with respect to the respective side note markers. The repositioning is performed in order to fit the side notes in the side note area that is defined by the side note area margins for this page. The misalignment parameter that was set in step 236 of FIG. 3h is used to determine the maximum movement of each side note. For example, the misalignment parameter may specify that a side note can only be moved 5 lines up or down (in the side margin) away from its marker. In step 455, the method determines if all of the side notes now fit on the page. If the result of step 455 is YES, then the method proceeds to step 451. However, if the result of step 455 is NO, then in step 457 the method splits the last side note using the parameter for widow and orphan lines, moving as much of the last side note as necessary to the next page. This moved side note information is carried over onto the side note area of the next page. But before proceeding to compose the next page, in step 459, the method determines if the side notes now fit on the current page. If YES, then the method proceeds to step 451 to either display or print the composed page. The method of FIGS. 2*d* and 12*a*–12*d* is performed for each page of the document.

Figure 12C:
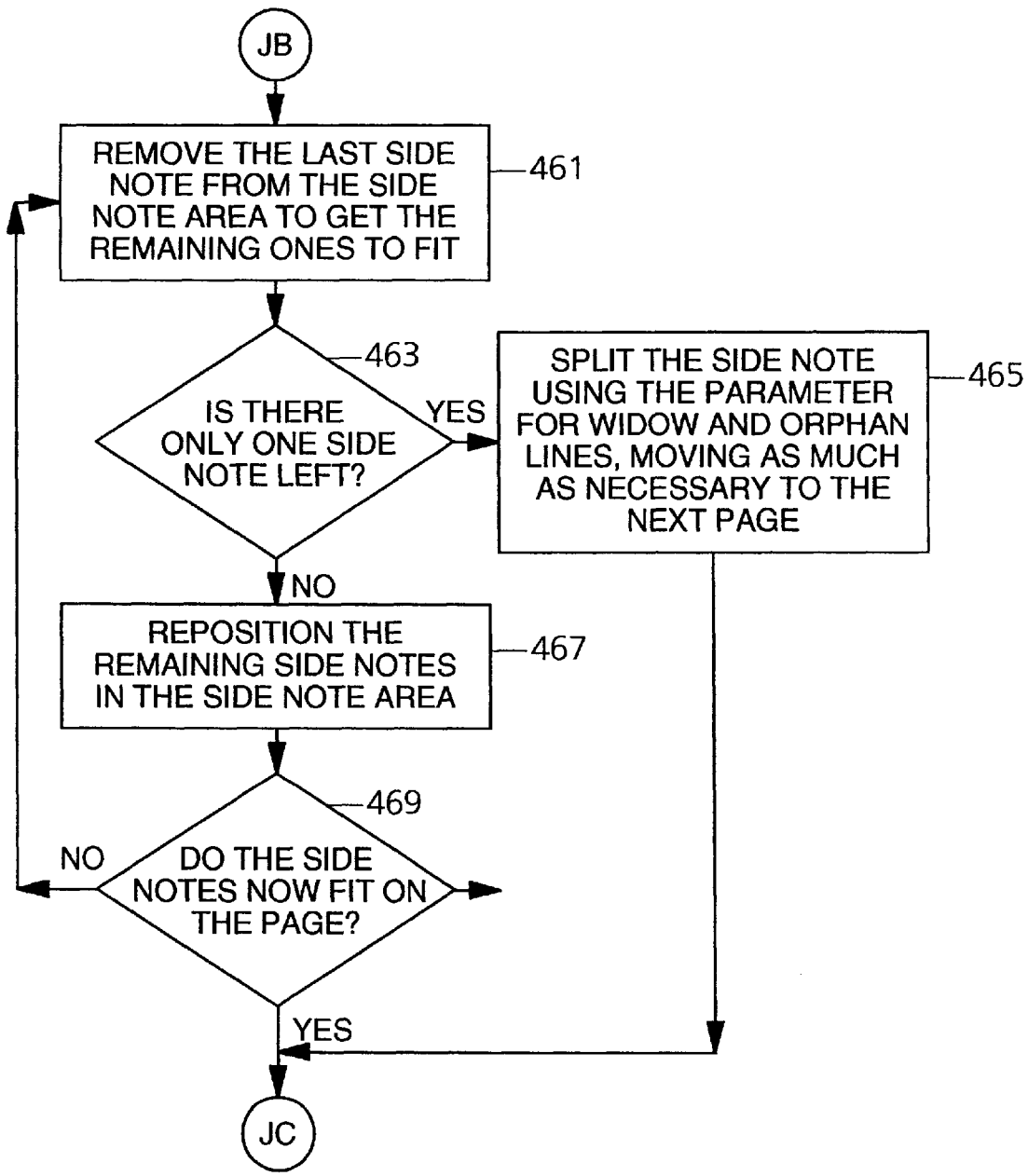
Figure 12D:
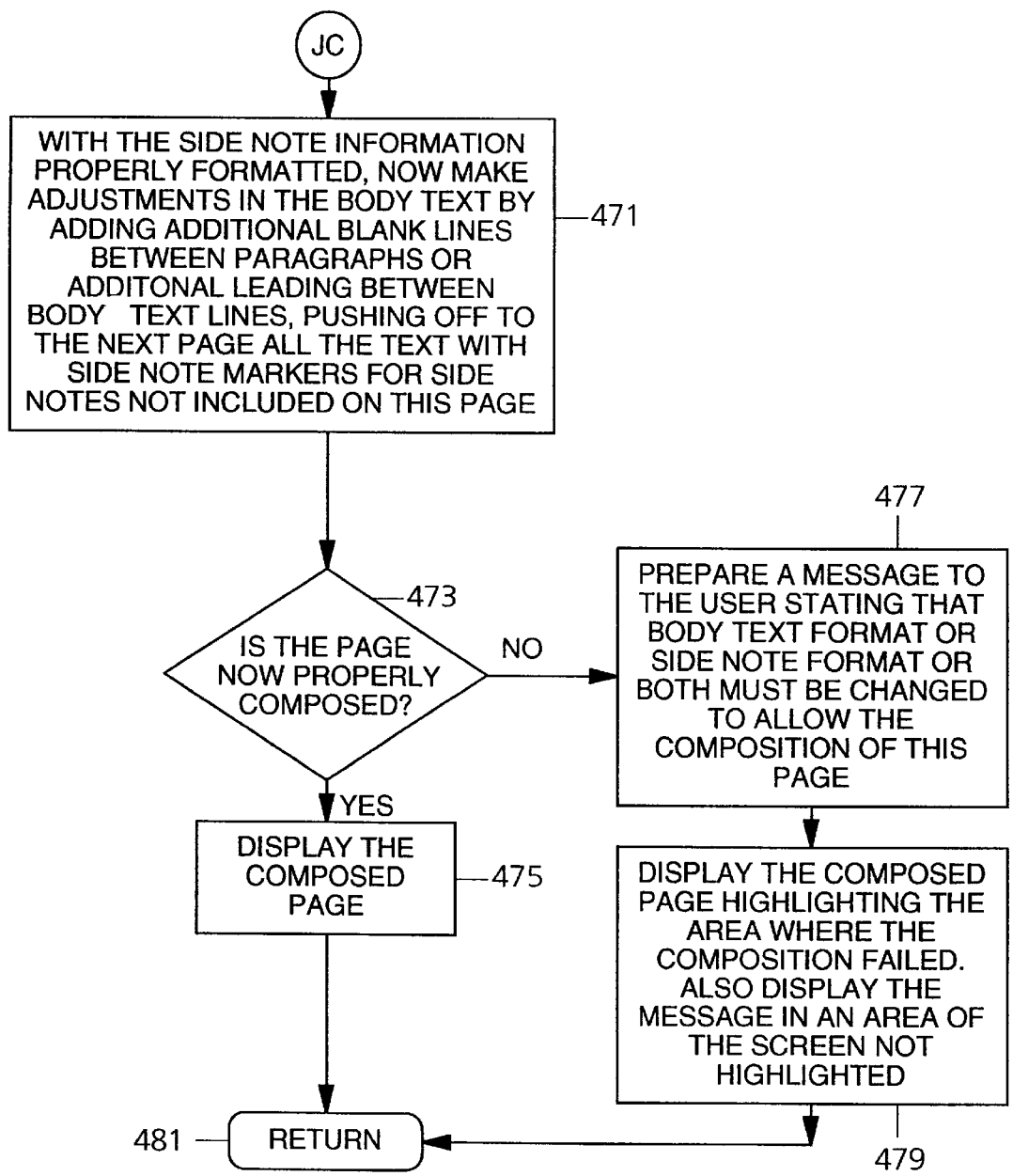

However, if the result of step 459 is NO, then the method proceeds to step 461 of FIG. 12*c*. In step 461, the method removes the last or bottom-most side note from the side note area on the page in order to have the remaining side notes fit. Then, in step 463 the method determines if there is only one side note left. If the result of step 463 is YES, then in step 465 the method splits the remaining side note using the parameter for widow and orphan lines, moving as much of the side note as necessary to the next page. If the result of step 463 is NO, then the remaining side notes are repositioned in the side note area, in the same manner as performed in step 453. After step 467, the method proceeds to step 469 to determine if the side notes now fit on the page. If the result is NO, then the method returns to step 461 to remove another side note from the page. If the result of step 469 is YES or after step 465 is performed, then the method proceeds to step 471 of FIG. 12*d*.

In step 471, the side note information is now properly formatted. This step makes adjustments in the body text by adding blank lines between paragraphs or additional leading between body text lines, thereby pushing off to the next page all of the text with side note markers for side notes that are not included on this page. Step 471 adds space between the body text lines so that the side notes will stay aligned with their respective side note marker in the body text.

Next, in step 473, the method determines if the page is now properly composed. If the result of step 473 is YES, then in step 475 the method displays or prints the composed page. If the result of step 473 is NO, then in step 477 the method prepares a message to the user informing the user that the body text format or side note format or both must be changed to allow the composition of the page. In step 479, the composed page is displayed highlighting the area where the composition failed. The message is displayed in an area of the screen that is not highlighted in order to avoid obscuring the highlighted area. The user may, for example, alter the formatting of the side note so as to fit more information into the side note area. After steps 475 or 479, the method returns, step 481.

Thus, the method first aligns the side notes to the lines of body text (or horizontal positions on non-text body objects), in order to maintain the association of the side notes to the applicable body portions. If the side notes are too big for the side note area on a page, then one by one, the side notes, or portions thereof, are moved to the next page. After aligning the side notes, then the body text is spaced apart with gaps, in order to accommodate the lengthy side notes.

The foregoing disclosure and the showings made in the drawings are merely illustrative of the principles of this invention and are not to be interpreted in a limiting sense.

What I claim is:

1. A computer implemented method of annotating a word processing object on a data processing system, said word processing object having a body with at least one side margin, comprising the steps of:

a) selecting a location in said body of said word processing object;

b) associating an annotation with said location;

c) providing said word processing object to an output means with said annotation being located in said side margin and adjacent to said selected location in said body of said word processing object;

d) revising said body;

e) after revising said body, aligning said annotation with said selected location such that said annotation remains adjacent to said selected location and in said side margin;

f) wherein said step of aligning said annotation with said selected location, further comprises the step of moving a portion of said annotation to a next page.

2. A computer implemented method of annotating a word processing object on a data processing system, said word processing object having a body with at least one side margin, comprising the steps of:

a) selecting a location in said body of said word processing object;

b) associating an annotation with said location;

c) providing said word processing object to an output means with said annotation being located in said side margin and adjacent to said selected location in said body of said word processing object;

d) revising said body;

e) after revising said body, aligning said annotation with said selected location such that said annotation remains adjacent to said selected location and in said side margin;

f) wherein said step of aligning said annotation with said selected location, further comprises the step of adding space in said body so as to maintain the alignment of said annotation and said selected location.

3. A computer implemented method of annotating a word processing object on a data processing system, said word processing object having a body with at least one side margin, comprising the steps of:

a) selecting a location in said body of said word processing object;

b) associating an annotation with said location;

c) providing said word processing object to an output means with said annotation being located in said side margin and adjacent to said selected location in said body of said word processing object;

d) revising said body;

e) after revising said body, aligning said annotation with said selected location such that said annotation remains adjacent to said selected location and in said side margin;

f) determining if two selected locations are contained in a single line of said body; and g) if two selected locations are in a single line of said body, moving at least one of said annotations associated with said two selected locations in said side margin within a predetermined number of lines of said body so that said annotations can be read without overlap.

4. A computer implemented method of annotating a word processing object on a data processing system, said word processing object having a body with at least one side margin, comprising the steps of:

a) selecting a location in said body of said word processing object;
b) accepting an annotation from a user;
c) incorporating said annotation into said word processing object by associating said annotation with said selected location in said body of said word processing object;
d) providing said annotation in typed form in said word processing object; and
e) providing said word processing object to an output means with said annotation being located in said side margin and adjacent to said selected location in said body of said word processing object;
f) formatting said annotation independently of said body and providing said word processing object to said output means with said formatted annotation.

5. The method of claim 4 wherein said step of formatting said annotation further comprises the step of setting a format parameter for said annotation from the group of parameters consisting of width of said annotation, one or more border lines around said annotation, typeface, typesize, typestyle, line spacing, line density, line adjusting, paragraph indenting, paragraph aligning, widow/orphan control, tabs and zone width.

6. A computer implemented method of annotating a word processing object on a data processing system, said word processing object having a body with at least one side margin, comprising the steps of:
a) selecting a location in said body of said word processing object;
b) accepting an annotation from a user;
c) incorporating said annotation into said word processing object by associating said annotation with said selected location in said body of said word processing object;
d) providing said annotation in typed form in said word processing object; and
e) providing said word processing object to an output means with said annotation being located in said side margin and adjacent to said selected location in said body of said word processing object;
f) segmenting said body into pages, said pages having right and left side margins;
g) locating a plurality of said annotations in alternating right and left side margins on sequential pages.

7. A data processing system for annotating a word processing object, said word processing object having a body with at least one side margin, comprising:
a) means for selecting a location in said body of said word processing object;
b) means for associating an annotation with said location;
c) means for providing said word processing object to an output means with said annotation being located in said side margin and adjacent to said selected location in said body of said word processing object;
d) means for revising said body;
e) means for aligning said annotation with said selected location, after revising said body, such that said annotation remains adjacent to said selected location and in said side margin;
f) wherein said means for aligning said annotation with said selected location, further comprises means for moving a portion of said annotation to a next page.

8. A data processing system for annotating a word processing object, said word processing object having a body with at least one side margin, comprising:
a) means for selecting a location in said body of said word processing object;
b) means for associating an annotation with said location;
c) means for providing said word processing object to an output means with said annotation being located in said side margin and adjacent to said selected location in said body of said word processing object;
d) means for revising said body;
e) means for aligning said annotation with said selected location, after revising said body, such that said annotation remains adjacent to said selected location and in said side margin;
f) wherein said means for aligning said annotation with said selected location, further comprises means for adding space in said body so as to maintain the alignment of said annotation and said selected location.

9. A data processing system for annotating a word processing object, said word processing object having a body with at least one side margin, comprising:
a) means for selecting a location in said body of said word processing object;
b) means for associating an annotation with said location;
c) means for providing said word processing object to an output means with said annotation being located in said side margin and adjacent to said selected location in said body of said word processing object;
d) means for revising said body;
e) means for aligning said annotation with said selected location, after revising said body, such that said annotation remains adjacent to said selected location and in said side margin;
f) means for determining if two selected locations are contained in a single line of said body; and
g) means for moving at least one of said annotations associated with said two selected locations in said side margin within a predetermined number of lines of said body so that said annotations can be read without overlap, if two selected locations are in a single line of said body.

10. A data processing system for annotating a word processing object, said word processing object having a body with at least one side margin, comprising:
a) means for selecting a location in said body of said word processing object;
b) means for accepting an annotation from a user;
c) means for incorporating said annotation into said word processing object by associating said annotation with said selected location in said body of said word processing object;
d) means for providing said annotation in typed form in said word processing object;
e) means for providing said word processing object to an output means with said annotation being located in said side margin and adjacent to said selected location in said body of said word processing object;
f) means for formatting said annotation independently of said body and providing said word processing object to said output means with said formatted annotation.

11. The system of claim 10 wherein said means for formatting said annotation further comprises means for setting a format parameter for said annotation from the group of parameters consisting of width of said annotation, one or more border lines around said annotation, typeface, typesize, typestyle, line spacing, line density, line adjusting, paragraph indenting, paragraph aligning, widow/orphan control, tabs and zone width.

12. A data processing system for annotating a word processing object, said word processing object having a body with at least one side margin, comprising:

a) means for selecting a location in said body of said word processing object;

b) means for accepting an annotation from a user;

c) means for incorporating said annotation into said word processing object by associating said annotation with said selected location in said body of said word processing object;

d) means for providing said annotation in typed form in said word processing object;

e) means for providing said word processing object to an output means with said annotation being located in said side margin and adjacent to said selected location in said body of said word processing object;

f) means for segmenting said body into pages, said pages having right and left side margins;

g) means for locating a plurality of said annotations in alternating right and left side margins on sequential pages.

* * * * *